US012122636B2

(12) United States Patent
Goto et al.

(10) Patent No.: US 12,122,636 B2
(45) Date of Patent: Oct. 22, 2024

(54) SHEET TRANSPORT DEVICE AND IMAGE FORMING APPARATUS

(71) Applicant: FUJIFILM Business Innovation Corp., Tokyo (JP)

(72) Inventors: Yasunobu Goto, Kanagawa (JP); Yoshinori Koike, Kanagawa (JP); Natsumi Nakata, Kanagawa (JP); Nobuhiro Hiroe, Kanagawa (JP); Hirotake Eguchi, Kanagawa (JP); Kiyoshi Watanabe, Kanagawa (JP); Koji Deguchi, Kanagawa (JP); Yoshiki Matsuzaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 145 days.

(21) Appl. No.: 17/948,002

(22) Filed: Sep. 19, 2022

(65) Prior Publication Data

US 2023/0312291 A1 Oct. 5, 2023

(30) Foreign Application Priority Data

Mar. 29, 2022 (JP) ................................ 2022-053718

(51) Int. Cl.
*B65H 9/00* (2006.01)
*B65H 5/06* (2006.01)
(Continued)

(52) U.S. Cl.
CPC ............ *B65H 9/002* (2013.01); *B65H 5/062* (2013.01); *B65H 15/004* (2020.08);
(Continued)

(58) Field of Classification Search
CPC .... G03G 15/6502; B65H 5/062; B65H 9/002; B65H 2301/333; B65H 2301/361;
(Continued)

(56) References Cited

U.S. PATENT DOCUMENTS

| | | | | |
|---|---|---|---|---|
| 6,059,285 | A * | 5/2000 | Suga | B65H 9/006 271/228 |
| 7,540,496 | B2 * | 6/2009 | Fukushima | B65H 9/002 271/253 |

(Continued)

FOREIGN PATENT DOCUMENTS

| | | | |
|---|---|---|---|
| JP | 2008-001473 | A | 1/2008 |
| JP | 2019-147663 | A | 9/2019 |

*Primary Examiner* — Leslie A Nicholson, III
(74) *Attorney, Agent, or Firm* — Oliff PLC

(57) ABSTRACT

A sheet transport device includes a pair of movable transport rollers capable of transporting a sheet while holding the sheet and capable of moving in an axial direction crossing a transportation direction; pairs of first transport rollers disposed upstream from the pair of movable transport rollers in the transportation direction while being spaced apart from each other to transport the sheet while holding the sheet; and pairs of transport guides disposed to define sheet transport spaces between the pair of movable transport rollers and the pairs of first transport rollers and between the pairs of first transport rollers. When the pair of movable transport rollers is to be moved in the axial direction, first transport rollers in at least one of the pairs of first transport rollers are separated not to hold at least part of a portion of the transported sheet located upstream from the pair of movable transport rollers.

18 Claims, 27 Drawing Sheets

(51) Int. Cl.

*B65H 15/00* (2006.01)
*G03G 15/00* (2006.01)
*B65H 29/60* (2006.01)

(52) U.S. Cl.

CPC ......... *G03G 15/6529* (2013.01); *B65H 29/60* (2013.01); *B65H 2301/331* (2013.01); *B65H 2301/333* (2013.01); *B65H 2404/1424* (2013.01); *B65H 2404/144* (2013.01)

(58) Field of Classification Search

CPC .... B65H 2301/5121; B65H 2404/1371; B65H 2404/1424; B65H 2404/144
USPC ................................ 271/184, 225, 272, 273
See application file for complete search history.

(56) References Cited

U.S. PATENT DOCUMENTS

| | | | | |
|---|---|---|---|---|
| 7,607,660 | B2 * | 10/2009 | Inoue | B65H 9/002 271/227 |
| 7,753,370 | B2 | 7/2010 | Inoue | |
| 8,366,104 | B2 * | 2/2013 | Sato | B65H 23/038 271/226 |
| 8,678,382 | B2 * | 3/2014 | Deno | B65H 7/08 271/228 |
| 8,851,470 | B2 * | 10/2014 | Matsumoto | B65H 7/02 271/228 |
| 9,022,384 | B2 * | 5/2015 | Hasegawa | B65H 9/002 271/245 |
| 9,776,818 | B2 * | 10/2017 | Hamaya | G03G 15/6564 |
| 10,011,447 | B2 * | 7/2018 | Nakamura | B65H 9/16 |
| 11,066,263 | B2 * | 7/2021 | Yamane | G03G 15/6567 |
| 11,661,302 | B2 * | 5/2023 | Atsumi | B65H 5/062 270/32 |

* cited by examiner

SHEET TRANSPORT DEVICE AND IMAGE FORMING APPARATUS

CROSS-REFERENCE TO RELATED APPLICATIONS

This application is based on and claims priority under 35 USC 119 from Japanese Patent Application No. 2022-053718 filed Mar. 29, 2022.

BACKGROUND

(i) Technical Field

The present disclosure relates to a sheet transport device and an image forming apparatus.

(ii) Related Art

Japanese Unexamined Patent Application Publication No. 2008-1473 (claims 1 and 2, and FIG. 2) describes a sheet transport device that includes a skew corrector that corrects skewing of a sheet by rotating the sheet while transporting the sheet, a crosswise registration corrector that is disposed downstream from the skew corrector to be movable in a direction perpendicular to the sheet transportation direction to correct the sheet position in the direction perpendicular to the sheet transportation direction, and an auxiliary sheet transport portion that is disposed upstream from the skew corrector to be movable in a direction perpendicular to the sheet transportation direction.

In the sheet transport device described in Japanese Unexamined Patent Application Publication No. 2008-1473 (claims 1 and 2, and FIG. 2), when the crosswise registration corrector performs position correction by moving the sheet in a direction perpendicular to the sheet transportation direction after the skew corrector performs sheet skewing correction, the auxiliary sheet transport portion moves in the same direction as the crosswise registration corrector in synchronization with the crosswise registration corrector.

The sheet skew corrector described in Japanese Unexamined Patent Application Publication No. 2008-1473 (claims 1 and 2, and FIG. 2) includes two pairs of sheet transport rotators independently disposed on a line perpendicular to the sheet transportation direction, and corrects sheet skewing using a difference in the sheet transport rate between the pairs of transport rotators. After the sheet skewing correction, the pairs of sheet transport rotators are released from pressure contact.

Japanese Unexamined Patent Application Publication No. 2019-147663 (claim 1 and FIG. 1) describes a sheet transport device including two pairs of clamp transport members capable of transporting sheets while holding the sheets and capable of moving in the width direction perpendicular to the transportation direction.

The sheet transport device described in Japanese Unexamined Patent Application Publication No. 2019-147663 (claim 1 and FIG. 1) moves one of the sheets in the width direction while holding the sheet with the two pairs of clamp transport members, and after moving the sheet in the width direction, separates, from each other, the two clamp transport members forming an upstream one of the two pairs of clamp transport members disposed upstream in the transportation direction, and transports the sheet with a downstream one of the two pairs of clamp transport members disposed downstream in the transportation direction.

SUMMARY

Aspects of non-limiting embodiments of the present disclosure relate to a sheet transport device and an image forming apparatus that, when moving, in an axial direction crossing a sheet transportation direction, one or more pairs of movable transport rollers movable in the axial direction, further reduce skewing or distortion of a portion of a sheet passing one or more of multiple pairs of transport rollers disposed upstream from the pair of movable transport rollers in the transportation direction while being spaced apart from each other, than in a case where the multiple pairs of transport rollers transport a sheet without changing a transport rate while holding a portion of the transported sheet.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a sheet transport device including a pair of movable transport rollers capable of transporting a sheet while holding the sheet and capable of moving in an axial direction crossing a transportation direction; pairs of first transport rollers disposed upstream from the pair of movable transport rollers in the transportation direction while being spaced apart from each other to transport the sheet while holding the sheet; and pairs of transport guides disposed to define sheet transport spaces between the pair of movable transport rollers and the pairs of first transport rollers and between the pairs of first transport rollers, wherein, when the pair of movable transport rollers is to be moved in the axial direction, first transport rollers in at least one of the pairs of first transport rollers are separated not to hold at least part of a portion of the transported sheet located upstream from the pair of movable transport rollers.

BRIEF DESCRIPTION OF THE DRAWINGS

Exemplary embodiments of the present disclosure will be described in detail based on the following figures, wherein.

DETAILED DESCRIPTION

Embodiments of the present disclosure will be described below with reference to the drawings.

First Exemplary Embodiment

Figure 1:
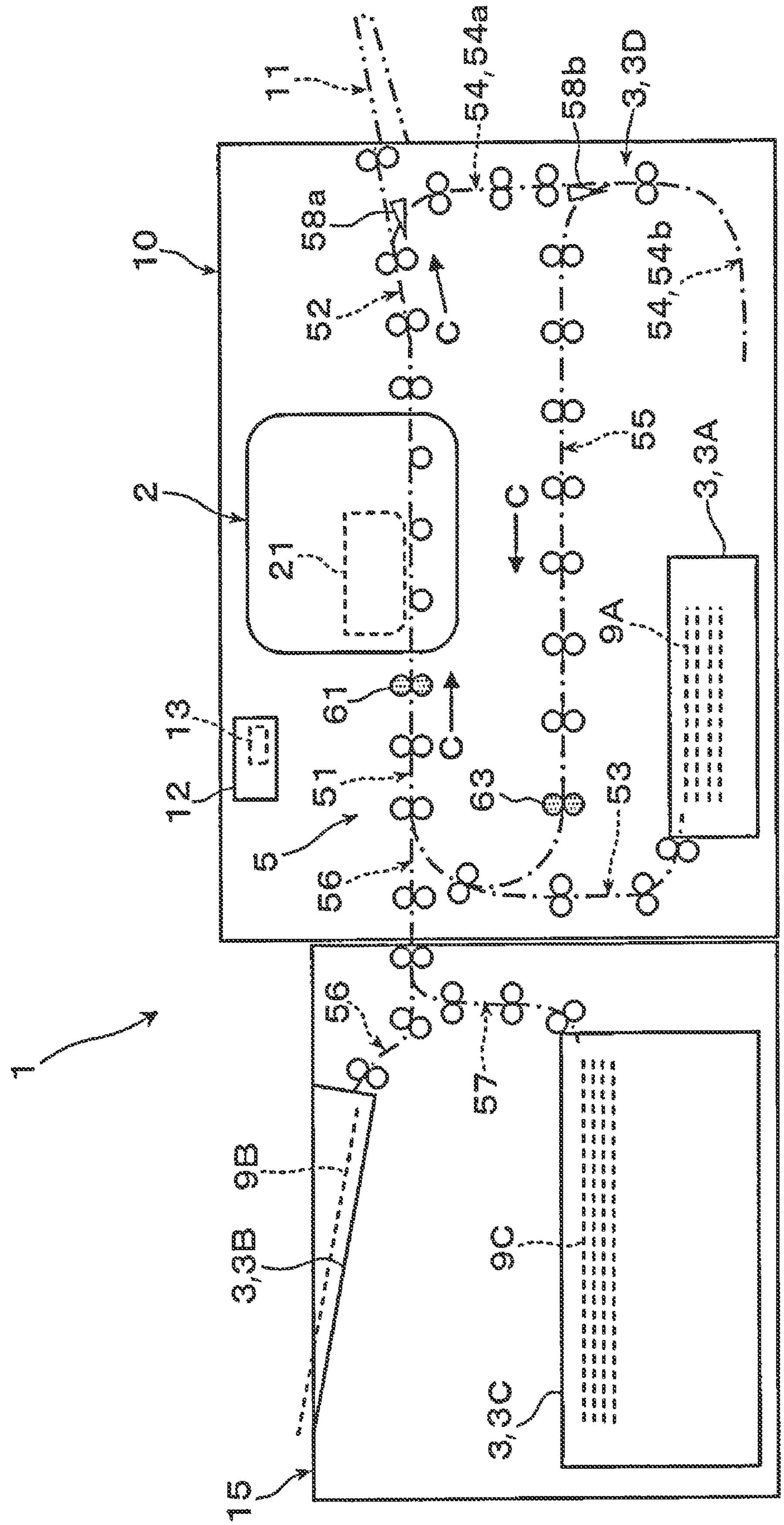
FIG. 1 is a schematic diagram of a sheet transport device and an image forming apparatus according to a first exemplary embodiment.
Figure 2:
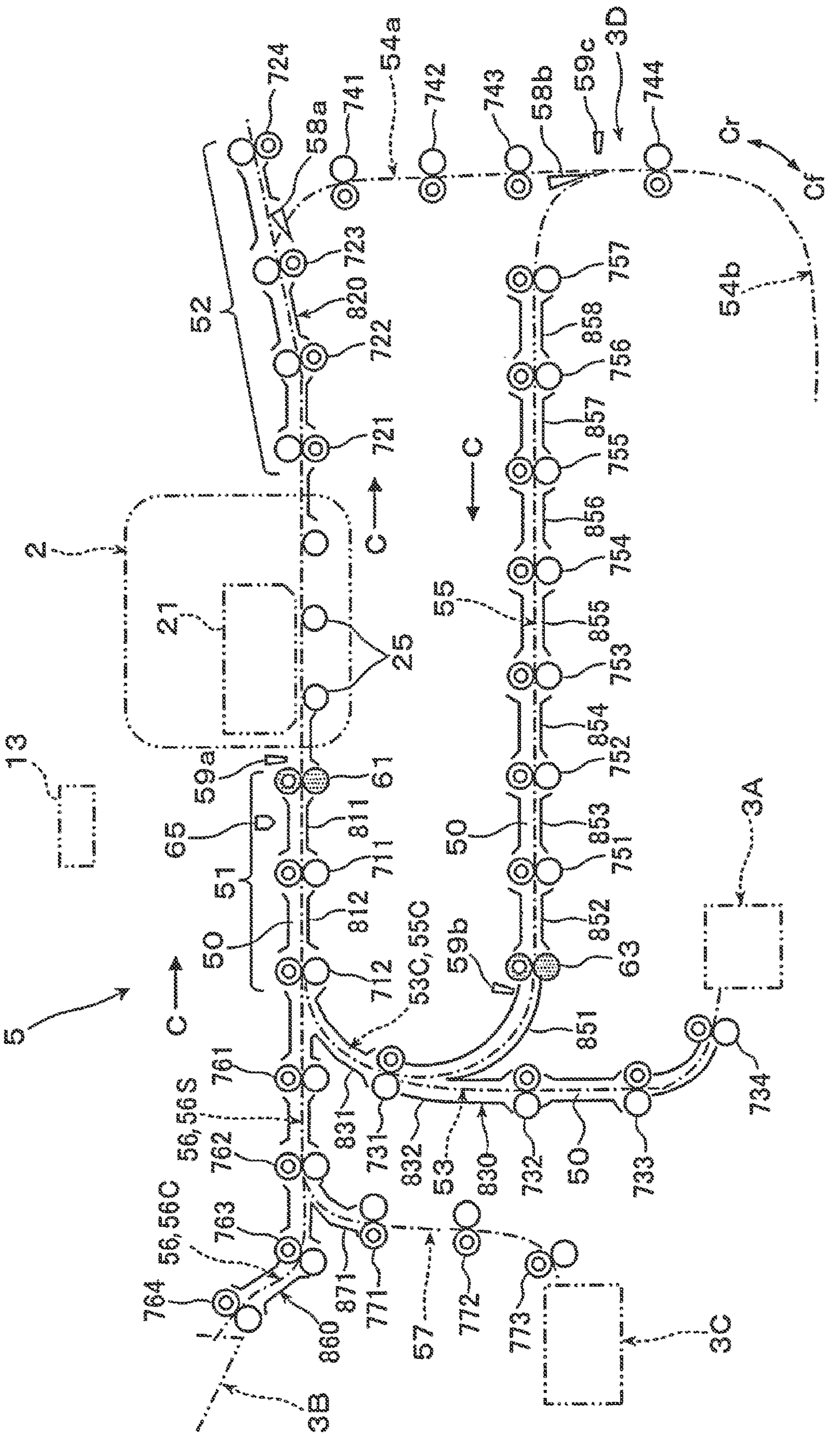
FIG. 2 is a schematic diagram of a sheet transport device used as the image forming apparatus illustrated in FIG. 1.

FIG. 1 is a schematic diagram of a sheet transport device 5 and an image forming apparatus 1 according to a first exemplary embodiment. FIG. 2 is a schematic diagram of the sheet transport device 5 included in the image forming apparatus 1.

Image Forming Apparatus

As illustrated in FIG. 1, the image forming apparatus 1 includes transportation start portions 3 from which sheets 9 are transported, an image forming portion 2 that forms an image on each sheet 9, and a sheet transport device 5 that transports the sheets from each transportation start portion 3 to the image forming portion 2.

The sheets 9 are media having a sheet shape, are transportable by the sheet transport device 5, and allow images formed thereon by the image forming portion 2.

More specifically, as illustrated in FIG. 1, the image forming apparatus 1 includes a body 10 and an add-on portion 15.

The body 10 has a housing with a predetermined shape. The body 10 includes, inside the housing, components such as the image forming portion 2, a first feeder 3A serving as an example of the transportation start portions 3, a final transport path 51, a discharging path 52, a first transport path 53, a reversal path 54, a re-transport path 55, part of a second transport path 56, and a control device 12. The final transport path 51, the discharging path 52, the first transport path 53, the reversal path 54, the re-transport path 55, and part of the second transport path 56 form the sheet transport device 5. At a side of the housing of the body 10, a discharging portion 11 is disposed to accommodate the discharged sheet 9. An operation portion or other components not illustrated are disposed at an upper portion or a front portion of the housing of the body 10.

The add-on portion 15 has a housing with a predetermined shape and is coupled to a side of the body 10. The add-on portion 15 includes, at an upper portion of the housing, a second feeder 3B serving as another example of the transportation start portions 3. The add-on portion 15 includes, inside the housing, components such as a third feeder 3C serving as another example of the transportation start portions 3, and the second transport path 56 and a third transport path 57 forming the sheet transport device 5.

The image forming portion 2 has a function of forming an intended image on each sheet 9. The image may be of any type or may have any material or other characteristics as long as the image is allowed to be formed on the sheet 9. For example, the image may be formed on the sheet 9 in the form of a plane.

In the first exemplary embodiment, for example, the image forming portion 2 forms images with a developer with, for example, an electrophotographic system.

Although not illustrated, the image forming portion 2 using, for example, the electrophotographic system includes, for example, an image carrier such as a photoconductor, a charging device that electrically charges the image carrier, and an image exposure device that exposes the charged image carrier to light to form an electrostatic latent image. Although not illustrated, the image forming portion 2 includes, for example, a developing device that develops the electrostatic latent image on the image carrier with a developer to form an unfixed developer image, a transfer device that directly or indirectly transfers the developer image on the image carrier to the sheet 9, and a fixing device that fixes the unfixed developer image transferred to the sheet 9 onto the sheet 9.

The image forming portion 2 includes an image transfer portion 21 that transfers the image formed by the image forming portion 2 to the sheet 9. As illustrated in FIG. 2, the image forming portion 2 also includes, for example, a transport guides not illustrated and transport support rollers 25 that introduce the sheet 9 to the image transfer portion 21 and allow the sheet 9 to pass thereby.

The image forming apparatus 1 transfers an image to the sheet 9 transported by the sheet transport device 5 when the sheet 9 passes through the image transfer portion 21.

Each transportation start portion 3 accommodates and feeds the sheets 9 to be transported.

In the first exemplary embodiment, for example, the first feeder 3A, the second feeder 3B, and the third feeder 3C are used as examples of the transportation start portions 3. Examples of the transportation start portions 3 also include a sheet inverter 3D formed from the reversal path 54, described later.

The first feeder 3A includes components such as a container that accommodates a pile of sheets 9A with a predetermined type and a predetermined size, and a discharging device that discharges the sheets 9A one by one from the container. The second feeder 3B includes components such as a mount portion that receives sheets 9B with a predetermined type and a predetermined size, and a discharging device that discharges the sheets 9B one by one from the mount portion. The third feeder 3C includes components such as a container that accommodates a pile of sheets 9C with a predetermined type and a predetermined size, and a discharging device that discharges the sheets 9C one by one from the container.

The sheets 9A, 9B, and 9C differ in type or size from each other, but any two or all of the sheets 9A, 9B, and 9C may be the same in type or size.

Sheet Transport Device

As illustrated in FIG. 1 or 2, the sheet transport device 5 has a function of feeding the sheets 9 of the type and the size usable by the image forming portion 2 from each transportation start portion 3 to transport the sheets 9 to the image forming portion 2 or another intended location.

The sheet transport device 5 according to the first exemplary embodiment includes components such as the final transport path 51, the discharging path 52, the first transport path 53, the reversal path 54, the re-transport path 55, the second transport path 56, and the third transport path 57.

The final transport path 51 is a path along which the sheets 9 are transported to be finally fed to the image forming portion 2 while the timing to feed the sheets 9 to the image forming portion 2 is adjusted or the transport angle of the sheets 9 is corrected.

The final transport path 51 includes components such as a pair of movable transport rollers 61, multiple pairs of first transport rollers 711 and 712, and multiple pairs of transport guides 811 and 812. The rollers in each pair rotate while forming a portion where they are in contact with each other to transport each sheet 9 while holding the sheet 9. The final transport path 51 according to the first exemplary embodiment extends substantially straight.

The pair of movable transport rollers 61 is a pair of transport rollers capable of transporting the sheet 9 while holding the sheet 9, and capable of moving in an axial direction D crossing a transportation direction C.

Figure 3A:
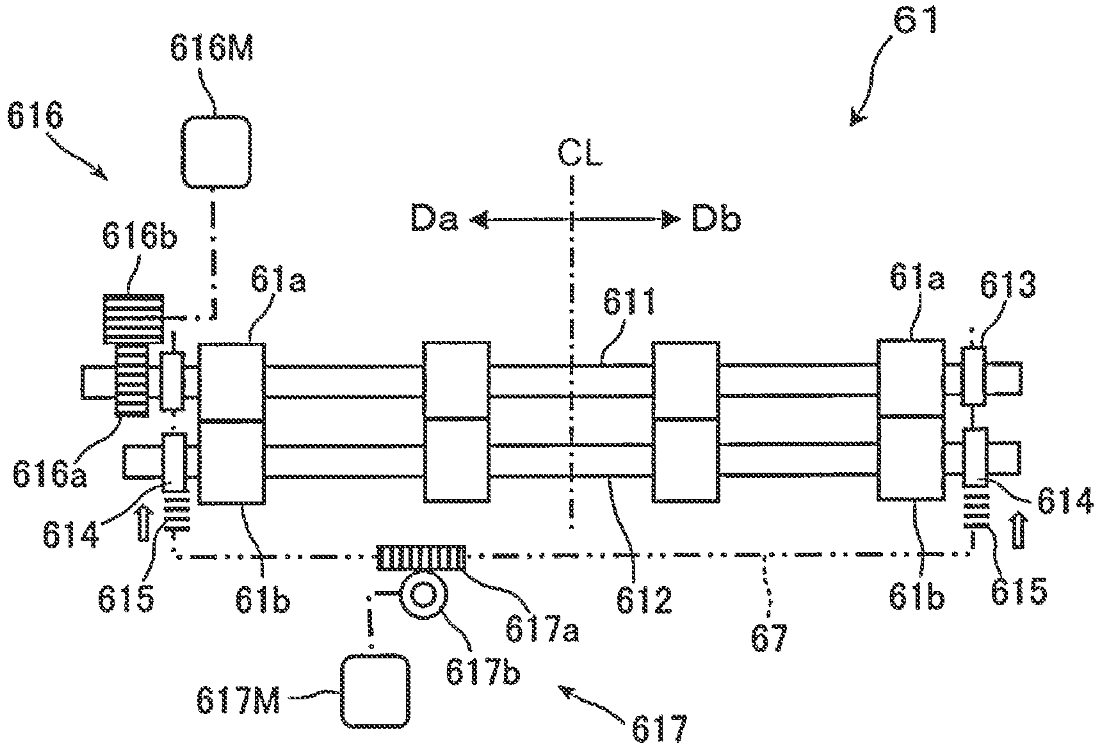
FIG. 3A is a schematic diagram of a first pair of movable transport rollers.

As illustrated in FIG. 3A, the pair of movable transport rollers 61 includes driving rollers 61*a* and driven rollers 61*b* forming pairs, a driving device 616, and a moving device 617.

The driving rollers 61*a* are predetermined pieces of components, and fixed to a rotation shaft 611 at a predetermined distance from each other. The driven rollers 61*b* are predetermined pieces of components, and fixed or rotatably attached to a rotation shaft 612 at a predetermined distance from each other.

In the first exemplary embodiment, driving rollers 61*a* and driven rollers 61*b* are each four divided pieces, but the number of divided pieces is not limited to this. The number of divided pieces holds true to pairs of transport rollers other than the pair of movable transport rollers 61.

The rotation shafts 611 and 612 are rotatably attached to a support frame 67 with bearings 613 and 614.

The driven rollers 61*b* receive the urging force from urging members 615 formed from, for example, coil springs to the driving rollers 61*a* via the bearings 614 displaceably attached to the support frame 67. Thus, the driven rollers 61*b* are in contact with the driving rollers 61*a* at a predetermined pressure.

The driving device 616 transmits the rotation power from a driving motor 616M to a gear 616*a* attached to a first end portion of the rotation shaft 611 via a transmission gear 616*b*. Thus, the driving device 616 rotates the driving rollers 61*a* in an intended direction.

The moving device 617 includes a rack 617*a* attached to the support frame 67, a pinion 617*b* engaged with the rack 617*a*, and a driving motor 617M that transmits the rotation power rotating the pinion 617*b*.

The moving device 617 rotates the pinion 617*b* by an intended amount in an intended direction to move the support frame 67 via the rack 617*a* by an intended distance in any of directions Da and Db of the axial direction D. The support frame 67 is attached to, for example, a body frame, not illustrated, of the sheet transport device 5 to be movable in the axial direction D.

The moving device 617 is not limited to the structure according to the first exemplary embodiment.

The pairs of first transport rollers 711 and 712 are multiple pairs of transport rollers that are disposed upstream from the pair of movable transport rollers 61 in the transportation direction C to form a sheet transport path, while being spaced apart from each other, and to transport the sheets 9 while holding the sheets 9.

The pair of first transport rollers 711 is a most downstream one of the pairs of first transport rollers disposed immediately upstream from the pair of movable transport rollers 61 in the transportation direction C.

Figure 3B:
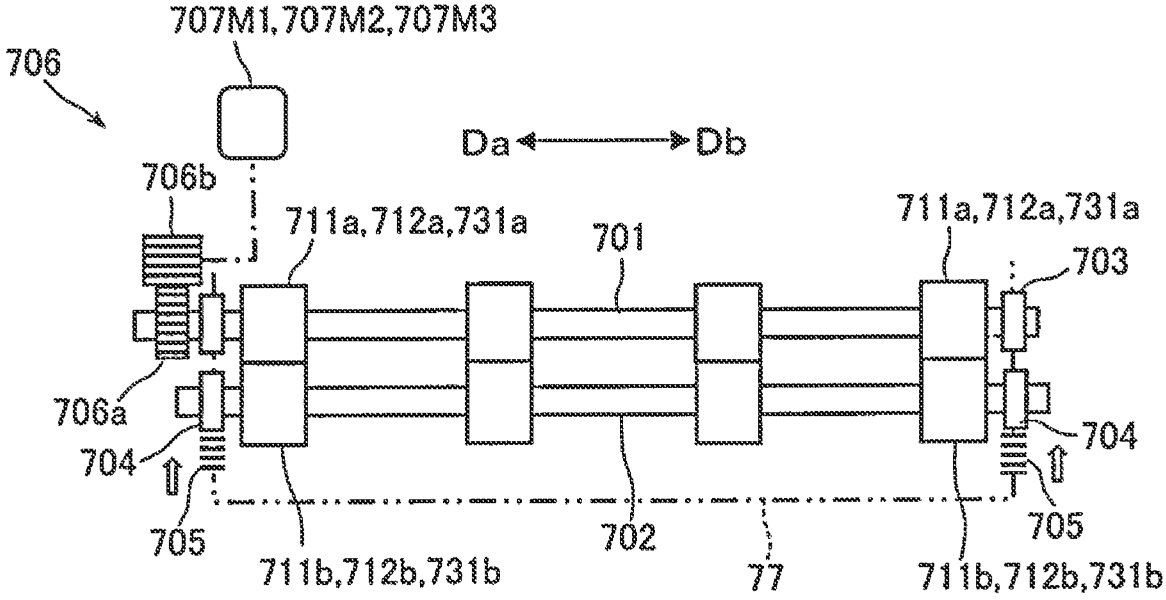
FIG. 3B is a schematic diagram of components including a pair of first transport rollers.

As illustrated in FIG. 3B, the pairs of first transport rollers 711 and 712 include driving rollers 711*a* and 712*a* and driven rollers 711*b* and 712*b*, respectively forming pairs, and a driving device 706.

The pairs of first transport rollers collectively refer to multiple pairs of transport rollers located to hold, when a sheet 9 with the maximum transportable length and handleable by the image forming apparatus 1 is transported and held by the pair of movable transport rollers 61, a portion 9*t* (refer to, for example, FIG. 10A) of the sheet 9 located upstream from the movable transport rollers 61 in the transportation direction C.

The driving rollers 711*a* and 712*a* are multiple divided pieces, which are fixed to a rotation shaft 701 while being spaced an intended distance apart from each other. The driven rollers 711*b* and 712*b* are multiple divided pieces, which are fixed or rotatably attached to a rotation shaft 702 while being spaced an intended distance apart from each other. In the first exemplary embodiment, the driving rollers 711*a* and 712*a* and the driven rollers 711*b* and 712*b* each include four divided pieces, but the number of divided pieces is not limited to this.

The rotation shafts 701 and 702 are rotatably attached to a support frame 77 via bearings 703 and 704.

The driven rollers 711*b* and 712*b* receive the urging force from urging members 705 formed from, for example, coil springs to the driving rollers 711*a* and 712*a* via the bearings 703 and 704 displaceably attached to the support frame 77. Thus, the driven rollers 711*b* and 712*b* are in contact with the driving rollers 711*a* and 712*a* at a predetermined pressure.

The driving device 706 transmits the rotation power from a driving motor 707M1 or 707M2 to a gear 706*a* attached to a first end portion of the rotation shaft 701 via a transmission gear 706*b*. Thus, the driving device 706 rotates the driving rollers 711*a* in an intended direction.

When multiple pairs of transport rollers are sequentially arranged at a distance from each other, the driving device 706 may be formed as a common driving device that collectively drives the multiple pairs of transport rollers except when each pair of transport rollers is to be disposed separately. This holds true to driving devices for other multiple pairs of transport rollers described below.

The pairs of transport guides 811 and 812 are multiple pairs of guide members disposed between the pair of movable transport rollers 61 and the pairs of first transport rollers 711 and 712 and between the pairs of first transport rollers 711 and 712 to form transport spaces 50 for the sheet 9.

As illustrated in FIG. 2, the transport guides 811 or 812 in each pair are disposed to face each other at an intended distance from each other between the pair of movable transport rollers 61 and the pairs of first transport rollers 711 and 712 or between the pairs of first transport rollers 711 and 712. Thus, the pairs of transport guides 811 and 812 form the transport spaces 50 forming spaces with a predetermined height between the pairs of rollers.

The pairs of transport guides 811 and 812 may form an integrated guide member by integrating the transport guides in different pairs disposed on the same side. Instead of a dedicated guide member, the pairs of transport guides 811 and 812 may be partially formed from a portion of another component disposed near the final transport path 51 serving as a guide surface. This holds true to other pairs of transport guides.

The discharging path 52 is a path along which the sheet 9 that has passed the image forming portion 2 is transported toward the discharging portion 11.

As illustrated in FIG. 2, the discharging path 52 includes components such as multiple pairs of transport rollers 721 to 724, and multiple pairs of transport guides 820. The pairs of transport rollers 721 to 724 have substantially the same structure as the pairs of first transport rollers 711 and 712. The pairs of transport guides 820 have substantially the same structure as the pairs of transport guides 811 and 812.

The first transport path 53 is a path along which the sheets 9A fed from the first feeder 3A are transported to the final transport path 51.

Figure 9:
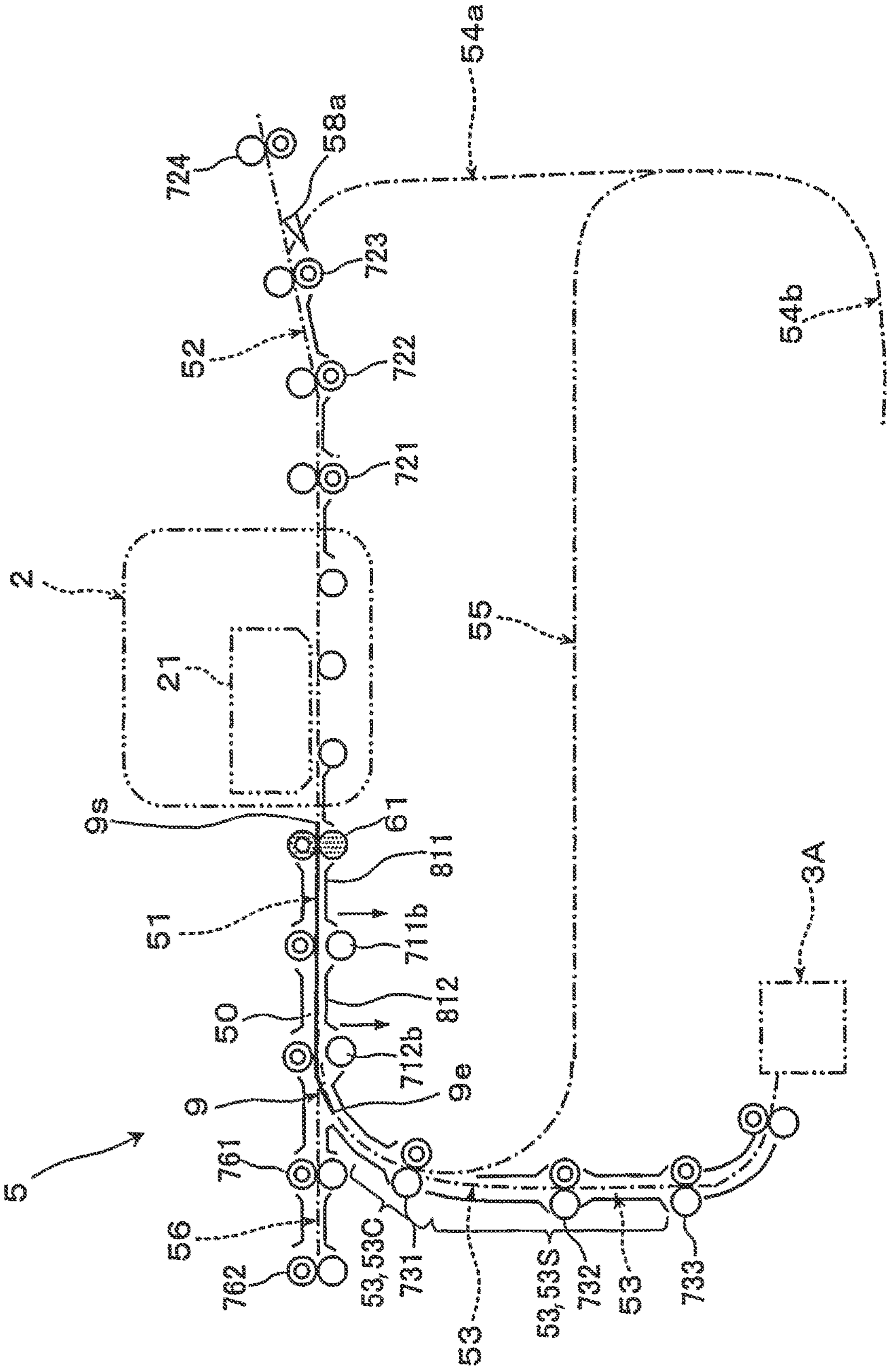
FIG. 9 is a schematic diagram of a related portion illustrating a sheet transportation state corresponding to a transportation operation performed when a pair of movable transport rollers is moved.

As illustrated in FIG. 2, the first transport path 53 includes components such as multiple pairs of transport rollers 731 to 734 and a pair of transport guides 830. As illustrated in FIG. 9, the first transport path 53 according to the first exemplary embodiment includes an intermediate section, which serves as an example of a specific section and is formed from a straight section 53S extending substantially straight, and an upstream section and a downstream section, which serve as other examples of a specific section and are formed from bent sections 53C.

The pairs of transport rollers 731 to 734 are arranged at a distance from each other in the transportation direction C to form the first transport path 53, and have substantially the same structure as the pairs of first transport rollers 711 and 712.

The pair of transport guides 830 includes components such as multiple pairs of transport guides 831 and 832 disposed closer to the final transport path 51, and has substantially the same structure as the pairs of transport guides 811 and 812. At a downstream end portion in the transportation direction C or at the pair of transport guides 831, the pair of transport guides 830 is connected to or merged with an upstream end portion of the final transport path 51 in the transportation direction C.

The second transport path 56 allows the sheets 9B fed from the second feeder 3B to be transported to the final transport path 51.

As illustrated in FIG. 2, the second transport path 56 includes components such as multiple pairs of transport rollers 761 to 764 and a pair of transport guides 860. The second transport path 56 according to the first exemplary embodiment includes an upstream section, which serves as an example of a specific section and is formed from a bent section 56C, and an intermediate section and a downstream section, which serve as other examples of a specific section and are formed from a straight section 56S extending substantially straight.

The pairs of transport rollers 761 to 764 are arranged at a distance from each other in the transportation direction C to form the second transport path 56, and have substantially the same structure as the pairs of first transport rollers 711 and 712.

The pair of transport guides 860 includes multiple pairs of transport guides, and has substantially the same structure as the pairs of transport guides 811 and 812. At a downstream end portion in the transportation direction C, the pair of transport guides 860 is connected to or merged with an upstream end portion of the final transport path 51 in the transportation direction C.

The third transport path 57 is a path along which the sheets 9C fed from the third feeder 3C are transported toward the final transport path 51.

As illustrated in FIG. 2, the third transport path 57 includes components such as multiple pairs of transport rollers 771 to 773, one pair of transport guides 871, and other pairs of transport guides not illustrated. The third transport path 57 according to the first exemplary embodiment includes sections that are all bent.

The pairs of transport rollers 771 to 773 are arranged at a distance from each other in the transportation direction C to form the third transport path 57, and have substantially the same structure as the pairs of first transport rollers 711 and 712. The pairs of transport guides not illustrated including the pair of transport guides 871 have substantially the same structure as the pairs of transport guides 811 and 812. At a downstream end portion in the transportation direction C, the pair of transport guides 871 is connected to or merged with a portion of the second transport path 56.

The reversal path 54 is a path that allows the sheets 9 that have passed the image forming portion 2 to be inverted while being transported.

The reversal path 54 according to the first exemplary embodiment includes a drawing path 54*a* that draws the sheet 9 that is to be inverted into the reversal path 54, and a reversal discharging path 54*b* along which the sheet 9 that has been drawn into the drawing path 54*a* is transported to be inverted. The reversal discharging path 54*b* temporarily stops and accommodates the sheet 9.

The drawing path 54*a* of the reversal path 54 includes components such as multiple pairs of transport rollers 741 to 743, multiple pairs of transport guides not illustrated, and a destination switching member 58*a*.

The pairs of transport rollers 741 to 743 are arranged at a distance from each other in the transportation direction C to form a drawing path, and have substantially the same structure as the pairs of first transport rollers 711 and 712. The pairs of transport guides not illustrated have substantially the same structure as the pairs of transport guides 811 and 812. Each of the pairs of transport guides forms a transport space that diverges from a portion of the discharging path 52 and extends to a lower portion of the body 10.

The destination switching member 58*a* is disposed at the portion diverging from the discharging path 52 toward the drawing path 54*a*, and partially enters either the discharging path 52 or the reversal path 54 to enable switching of the destination of the sheet 9.

The destination switching member 58*a* moves to either one of a discharging switch position for guiding the sheet 9 to be transported to the discharging path 52 and a reversal switch position for guiding the sheet 9 to be transported to the reversal path 54, and stops in the position.

The reversal discharging path 54*b* of the reversal path 54 includes components such as a pair of transport rollers 744, multiple pairs of transport guides not illustrated, and a destination switching member 58*b*.

The pair of transport rollers 744 has substantially the same structure as the pairs of first transport rollers 711 and 712, and is capable of switching the rotation direction to a forward or rearward direction. The pairs of transport guides not illustrated form a transport space with a length and a shape that allow the sheet 9 in full length to be drawn into the drawing path 54*a*, temporarily accommodate the sheet 9 in the drawing path 54*a*, and then allow the sheet 9 to be fed to the re-transport path 55 while having the trailing end of the sheet 9 in the transportation direction when drawn serving as the leading end. The pairs of transport guides have substantially the same structure as the pairs of transport guides 811 and 812. The pair of transport guides at an upstream end portion in the transportation direction C forms a diverging connection portion that is connected to the re-transport path 55.

The destination switching member 58*b* is disposed at the diverging portion of the reversal discharging path 54*b* to be connected to the re-transport path 55, and partially enters the drawing path 54*a* to be capable of switching the destination of the sheet 9 to the re-transport path 55. The destination switching member 58*b* moves to either a reversal switch position for guiding the sheet 9 to be transported to the reversal discharging path 54*b* or a re-transport switch position for guiding the sheet 9 to the re-transport path 55, and stops in the position.

The re-transport path 55 is a path along which the sheet 9 inverted at the reversal path 54 is transported again toward the final transport path 51.

The re-transport path 55 includes components such as a pair of movable transport rollers 63, multiple pairs of second transport rollers 711, 712, and 731 disposed between the two pairs of movable transport rollers 61 and 63, multiple pairs of third transport rollers 751 to 757 disposed upstream from the pair of movable transport rollers 63 in the transportation direction C, and multiple pairs of transport guides 811, 812, 831, 832, and 851 to 858.

Figure 12:
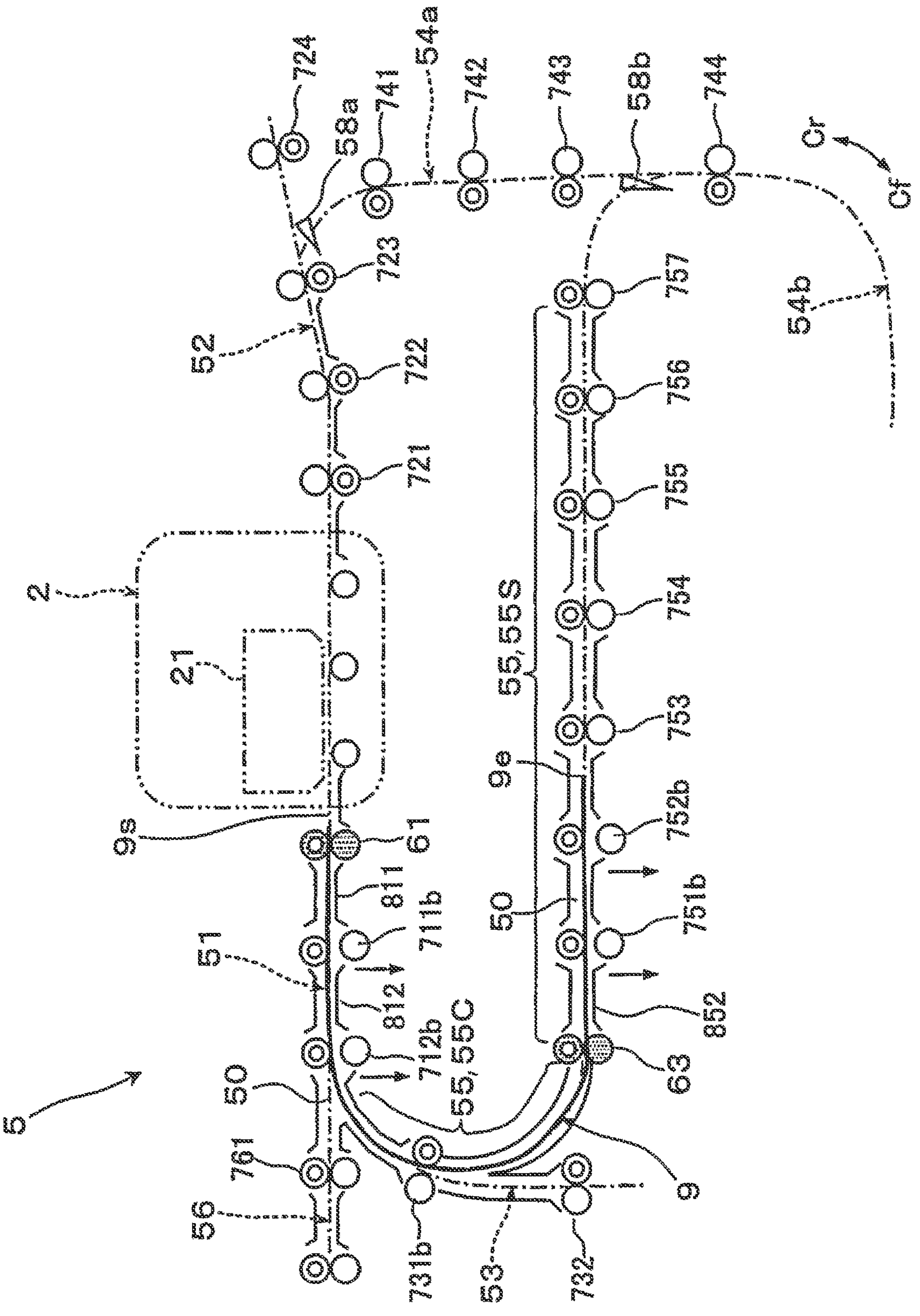
FIG. 12 is a schematic diagram of a related portion of the sheet transportation state corresponding to the transportation operation performed when two pairs of movable transport rollers are moved.

As illustrated in FIG. 12 and other drawings, the re-transport path 55 according to the first exemplary embodiment includes an upstream section, which serves as an example of a specific section and is formed from a bent section 55C, and an intermediate section and a downstream section serving as examples of specific sections and formed from a straight section 55S extending substantially straight. The bent section 55C of the re-transport path 55 is merged with the bent section 53C of the first transport path 53 to overlap the bent section 53C.

The pair of movable transport rollers 63 is a pair of transport rollers capable of transporting the sheet 9 while holding the sheet 9 and capable of moving in the axial direction D crossing the transportation direction C. The pair of movable transport rollers 63 is an upstream pair of movable transport rollers disposed upstream from the pair of movable transport rollers 61 in the transportation direction C.

Figure 4A:
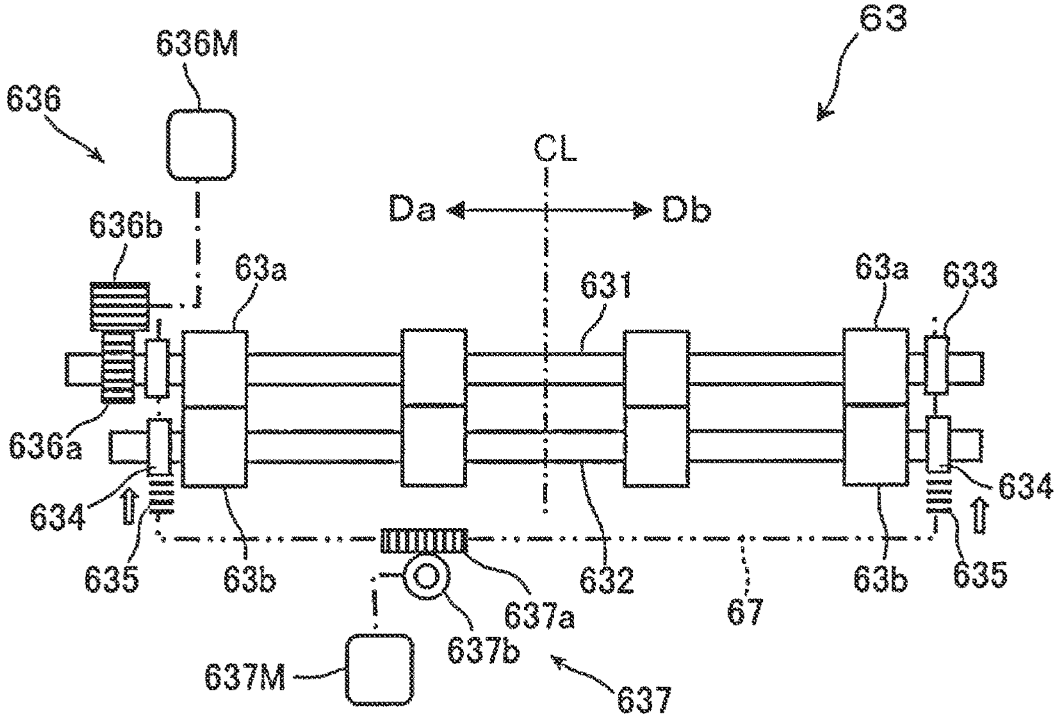
FIG. 4A is a schematic diagram of a second pair of movable transport rollers.

As illustrated in FIG. 4A, the pair of movable transport rollers 63 includes driving rollers 63*a* and driven rollers 63*b* forming pairs, a driving device 636, and a moving device 637.

The driving rollers 63*a* and the driven rollers 63*b* have substantially the same structure as the driving rollers 61*a* and the driven rollers 63*b* in the pair of movable transport rollers 61. In FIG. 4A, the pair of movable transport rollers 63 includes rotation shafts 631 and 632 of the driving rollers 63*a* and the driven rollers 63*b*, urging members 635, and the support frame 67.

The driving device 636 transmits the rotation power from a driving motor 636M to a gear 636*a* attached to a first end portion of the rotation shaft 631 via a transmission gear 636*b* to rotate the driving rollers 63*a* in an intended direction.

The moving device 637 moves the support frame 67, via a rack 637*a* attached to the support frame 67, by only an intended distance in any of the directions Da and db of the axial direction D via a pinion 637*b* that receives rotation power from a driving motor 637M rotating by an intended amount in an intended direction. The moving device 637 is not limited to the structure according to the first exemplary embodiment.

The pairs of second transport rollers 711, 712, and 731 are pairs of transport rollers disposed between the two pairs of movable transport rollers 61 and 63.

The pairs of second transport rollers 711, 712, and 731 have the above structure (refer to FIG. 3B).

The pairs of third transport rollers 751 to 757 are multiple pairs of transport rollers that are arranged at a distance from each other upstream from the upstream pair of movable transport rollers 63 in the transportation direction C to form a sheet transport path to transport the sheet 9 while holding the sheet 9. The pair of third transport rollers 751 is a most downstream one of the pairs of third transport rollers disposed immediately upstream from the pair of movable transport rollers 63 in the transportation direction C.

Figure 4B:
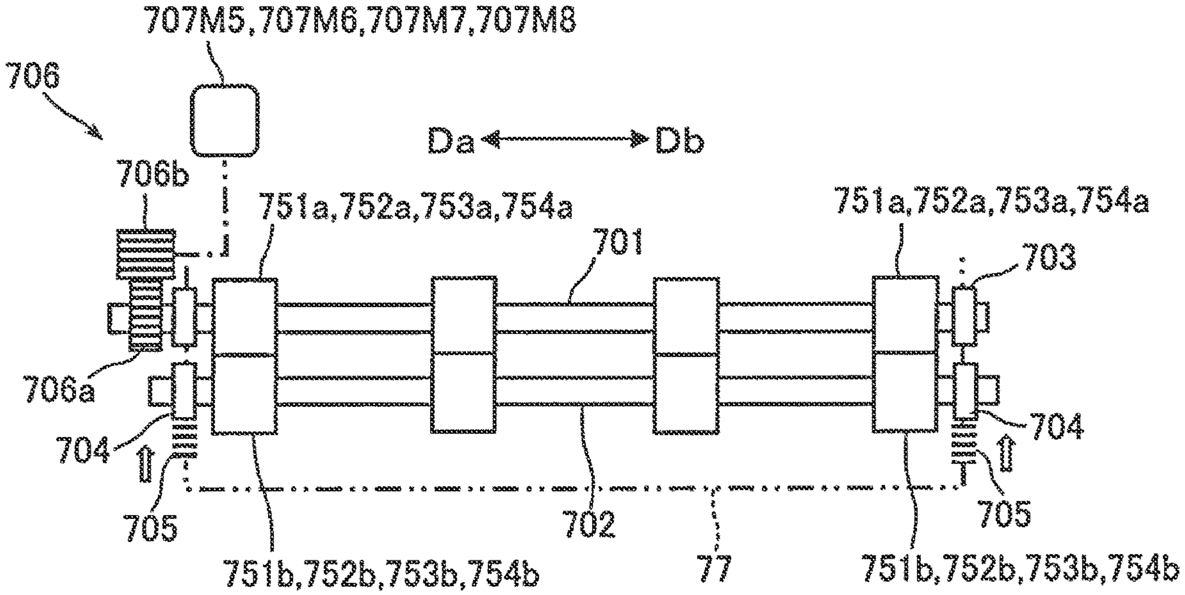
FIG. 4B is a schematic diagram of a pair of third transport rollers.

The pairs of third transport rollers 751 to 754 typically illustrated in FIG. 4B include driving rollers 751*a*, 752*a*, 753*a*, and 754*a* and driven rollers 751*b*, 752*b*, 753*b*, and 754*b* forming pairs, and the driving device 706. The pairs of third transport rollers 755 to 757 also have the similar structure.

The pairs of third transport rollers refer to multiple pairs of transport rollers located to hold, when a sheet 9 with a maximum transportable length and handleable by the image forming apparatus 1 is transported and held by the two pairs of movable transport rollers 61 and 63, the portion 9*t* (refer to, for example, FIG. 13A) of the sheet 9 located upstream from the upstream pair of movable transport rollers 63 in the transportation direction C.

The driving rollers 751*a*, 752*a*, 753*a*, and 754*a* and the driven rollers 751*b*, 752*b*, 753*b* and 754*b* have the same structures as driving rollers 711*a*, 712*a*, and 731*a* and driven rollers 711*b*, 712*b*, and 731*b* in the pairs of first transport rollers 711 and 712, and the pairs of second transport rollers 711, 712, and 731 (refer to FIG. 3B).

The driving device 706 has the same structure as the driving device 706 for the pairs of first transport rollers 711 and 712 and the pairs of the second transport rollers 711, 712, and 731 (refer to FIG. 3B).

Figure 5A:
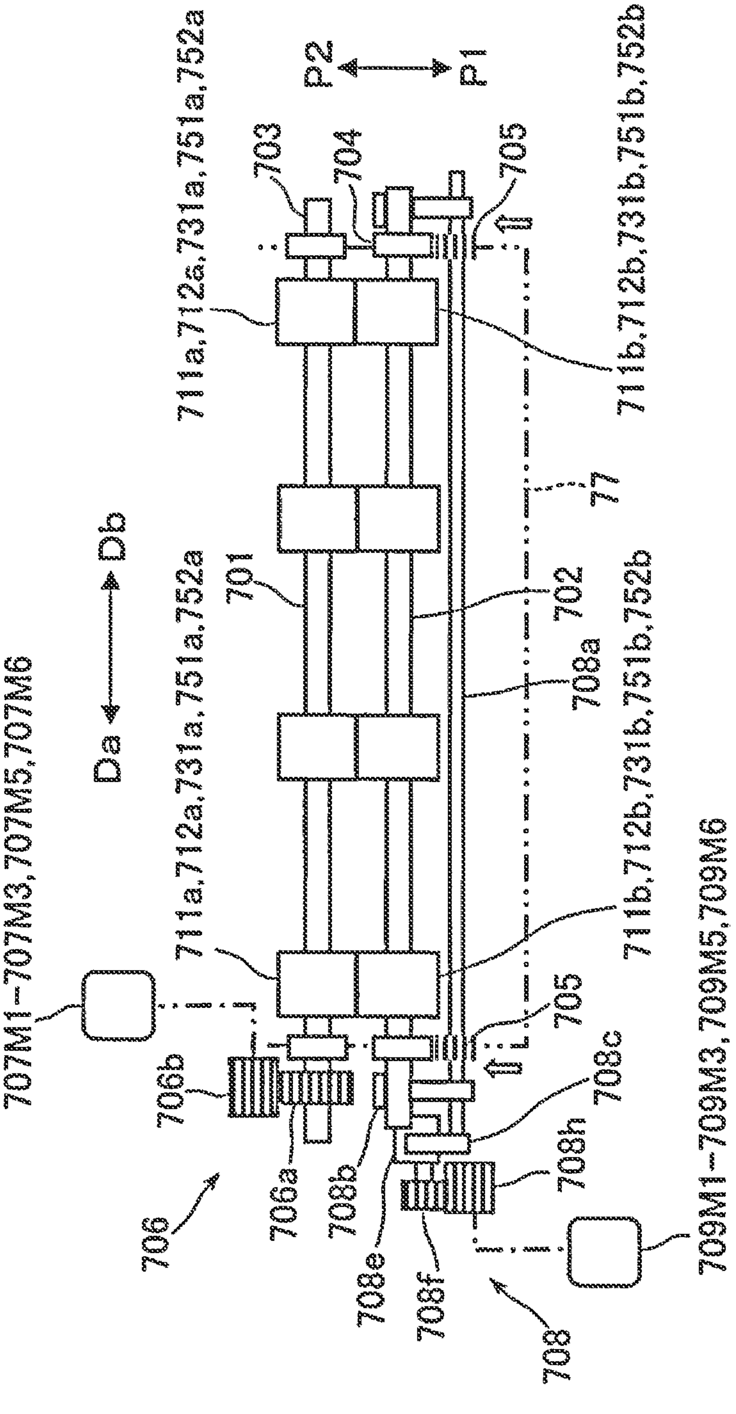
FIG. 5A is a schematic diagram of a pair of separable transport rollers.
Figure 5B:
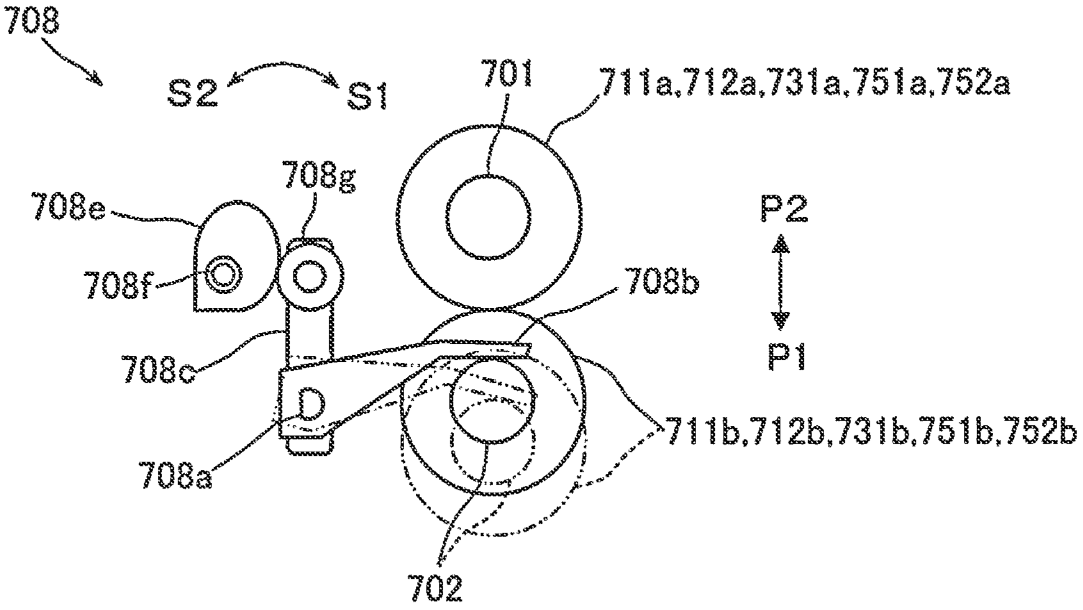
FIG. 5B is a side schematic diagram of the pair of transport rollers in FIG. 5A.

As illustrated in FIGS. 5A and 5B, in the sheet transport device 5, the pairs of transport rollers 711, 712, and 731 corresponding to both the pairs of first transport rollers and the pairs of second transport rollers and the pairs of third transport rollers 751 and 752 are pairs of separable transport rollers that are switchable to a separated state from a contact state in the normal state.

These pairs of separable transport rollers 711, 712, 731, and 751 each include a separating device 708.

In the separating device 708, a pressing bar 708*b* fixedly attached to a rotation shaft 708*a* is lowered in a direction of arrow P1 by an eccentric cam 708*e*, to press the rotation shafts 702 of the driven roller 711*b*, 712*b*, 731*b*, 751*b*, or 752*b* in a direction away from the rotation shaft 701 against the urging force of the urging members 705. Thus, the driven roller 711*b*, 712*b*, 731*b*, 751*b*, or 752*b* is separated from the corresponding driving roller 711*a*, 712*a*, 731*a*, 751*a*, or 752*a*.

A swing bar 708*c* is fixedly attached to the rotation shaft 708*a*. A cam receiver 708*g* is disposed at a free end portion of the swing bar 708*c*. The eccentric cam 708*e* is fixed to a rotation shaft 708*f*. The rotation shaft 708*f* receives the rotation power of one of driving motors 709M1 to 709M3 and 709M5 transmitted via a gear 708*h*, and rotates by an intended angle in an intended direction. When rotated by the rotation shaft 708*f*, a large-diameter portion and a small-diameter portion of the eccentric cam 708*e* come into contact with the cam receiver 708*g*.

When the swing bar 708*c* is swung by the eccentric cam 708*e* against the urging force of an urging member not illustrated in a direction of arrow S1, the separating device 708 is moved to lower the pressing bar 708*b* in the direction of arrow P1. Thus, the rotation shaft 702 is moved away from the rotation shaft 701.

When the swing bar 708*c* is swung by the eccentric cam 708*e* in the direction of arrow S2, the separating device 708 is moved to raise the pressing bar 708*b* in the direction of arrow P2. Thus, the rotation shaft 702 is moved toward the rotation shaft 701 to be returned to a contact position in a normal state.

When the multiple pairs of separable transport rollers are sequentially arranged at a distance from each other, the separating device 708 may be one common separating device that collectively separates the multiple pairs of transport rollers except when needed for each pair of transport rollers.

As illustrated in FIG. 2, the sheet transport device 5 includes a first passage sensor 59*a*, a second passage sensor 59*b*, a third passage sensor 59*c*, and a misregistration detector 65.

The first passage sensor 59*a* is a sensor that detects that a leading end 9*s* and a trailing end 9*e* of the sheet 9 transported along the final transport path 51 have passed through the pair of movable transport rollers 61. The first passage sensor 59*a* is located at a portion of the final transport path 51 downstream from the pair of movable transport rollers 61 and in front of the image forming portion 2 in the transportation direction C.

The second passage sensor 59*b* is a sensor that detects that the trailing end 9*e* of the sheet 9 transported along the re-transport path 55 has finished passing through the pair of movable transport rollers 63. The second passage sensor 59*b* is located at a portion of the re-transport path 55 downstream from the pair of movable transport rollers 63 in the transportation direction C.

The third passage sensor 59*c* is a sensor that detects that the trailing end 9*e* of the sheet 9 transported along the reversal path 54 has finished passing the destination switching member 58*b*. The third passage sensor 59*c* is located at a portion of the reversal path 54 downstream from the destination switching member 58*b* in the transportation direction C.

Optical sensors are used as examples of the first passage sensor 59*a*, the second passage sensor 59*b*, and the third passage sensor 59*c*.

The misregistration detector 65 is a sensor that detects deviation of the sheet 9 transported along the final transport path 51 from a transportation reference line CL in the axial direction (width direction) D. The misregistration detector 65 is located at a portion of the final transport path 51 between the pair of movable transport rollers 61 and a most downstream pair of first transport rollers 711, among the pairs of first transport rollers, disposed immediately upstream from the pair of movable transport rollers 61 in the transportation direction C.

A device formed from, for example, an image reading sensor or an image processing device is used as an example of the misregistration detector 65.

Figure 6:
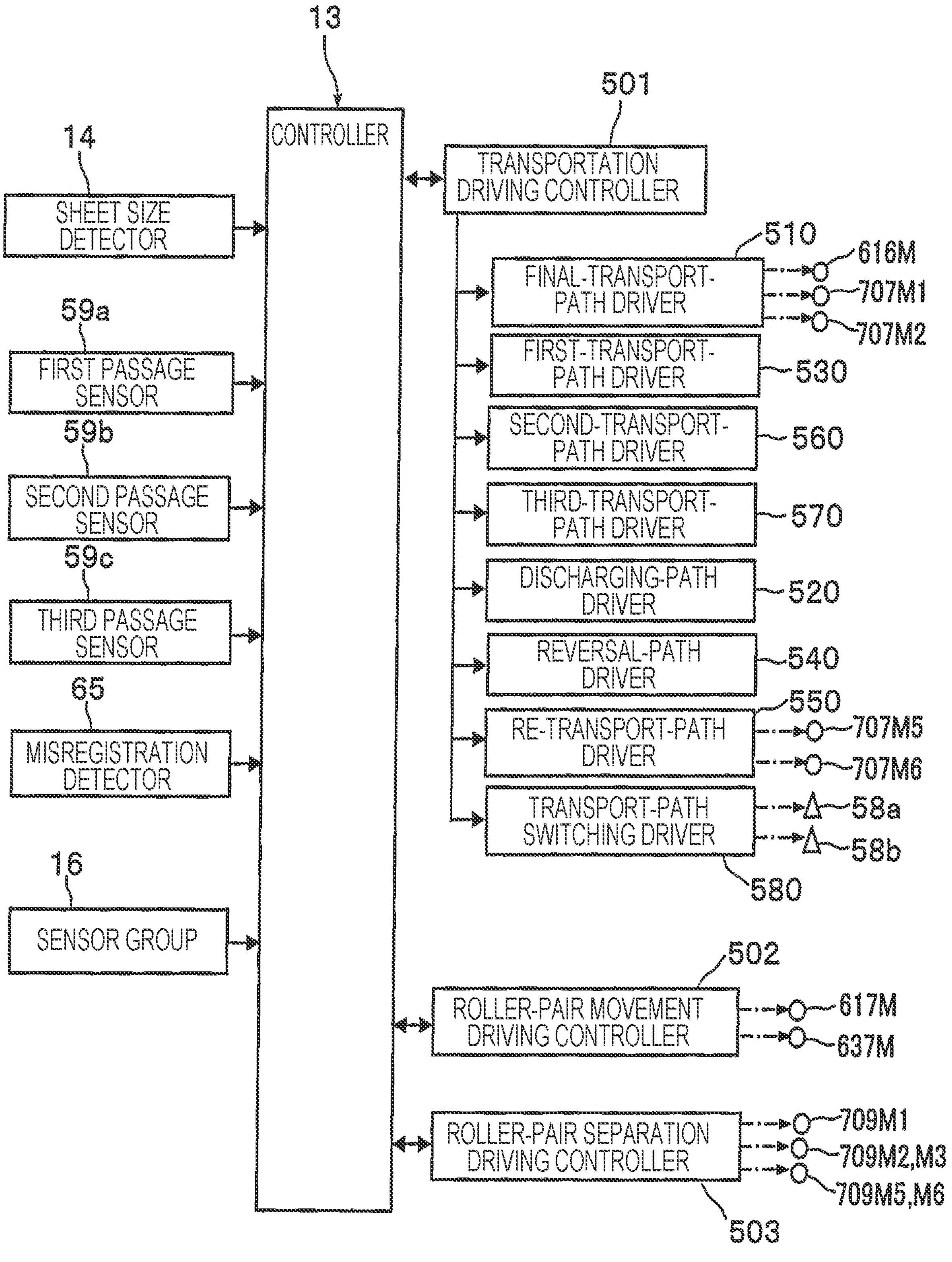
FIG. 6 is a functional block diagram of a control system of a sheet transport device.

As illustrated in FIG. 6, the sheet transport device 5 also includes a controller 13.

The controller 13 is formed from a device such as a microcomputer including, for example, a processor, a storage, and an input-output device. The controller 13 may be an independent control device, or a portion, as illustrated in FIG. 1, having a controlling function, of the control device 12 that generally controls the entire operations of the image forming apparatus 1.

As illustrated in FIG. 6, components such as a transportation driving controller 501, a roller-pair movement driving controller 502, and a roller-pair separation driving controller 503 are connected to the controller 13 for enabling communications of information.

The transportation driving controller 501 controls the transportation operation at each transport path.

Components such as a final-transport-path driver 510, a first-transport-path driver 530, a second-transport-path driver 560, a third-transport-path driver 570, a discharging path driver 520, a reversal path driver 540, a re-transport path driver 550, and a transport-path switching driver 580 are connected to the transportation driving controller 501 to be controlled by the transportation driving controller 501.

The final-transport-path driver 510 is a driver to perform the transportation operation at the final transport path 51. The final-transport-path driver 510 includes components such as the driving motor 616M of the pair of movable transport rollers 61 and the driving motors 707M1 and 707M2 of the pairs of first transport rollers 711 and 712.

The first-transport-path driver 530 is a driver to perform the transportation operation at the first transport path 53. The second-transport-path driver 560 is a driver to perform the transportation operation at the second transport path 56. The third-transport-path driver 570 is a driver to perform the transportation operation at the third transport path 57.

The discharging path driver 520 is a driver to perform the transportation operation at the discharging path 52. The reversal path driver 540 is a driver to perform the transportation operation at the reversal path 54. The re-transport path driver 550 is a driver to perform the transportation operation at the re-transport path 55.

The transport-path switching driver 580 is a driver to perform a switching operation on the destination switching members 58*a* and 58*b*.

The roller-pair movement driving controller 502 is a driver to perform the moving operation on the two pairs of movable transport rollers 61 and 63. The roller-pair movement driving controller 502 includes components such as the driving motors 617M and 637M.

The roller-pair separation driving controller 503 is a driver to perform the separation operation on, for example, the pairs of separable transport rollers 711, 712, 731, 751, and 752. The roller-pair separation driving controller 503 includes components such as driving motors 709M1, 709M2, 709M3, 709M5, and 709M6.

As illustrated in FIG. 6, components such as a sheet size detector 14, the first passage sensor 59*a*, the second passage sensor 59*b*, the third passage sensor 59*c*, the misregistration detector 65, and a sensor group 16 are connected to the controller 13 to enable communications of information.

The sheet size detector 14 is formed as an obtaining unit that obtains size information of the sheet 9 included in command information for the image forming operation input to the image forming apparatus 1, or as a measuring device that measures the size of the sheets 9A, 9B, and 9C accommodated in the feeders 3A, 3B, and 3C.

The sensor group 16 includes a group of sensors that detect various information used for, for example, the transportation operation of the sheets 9.

Figure 7A:
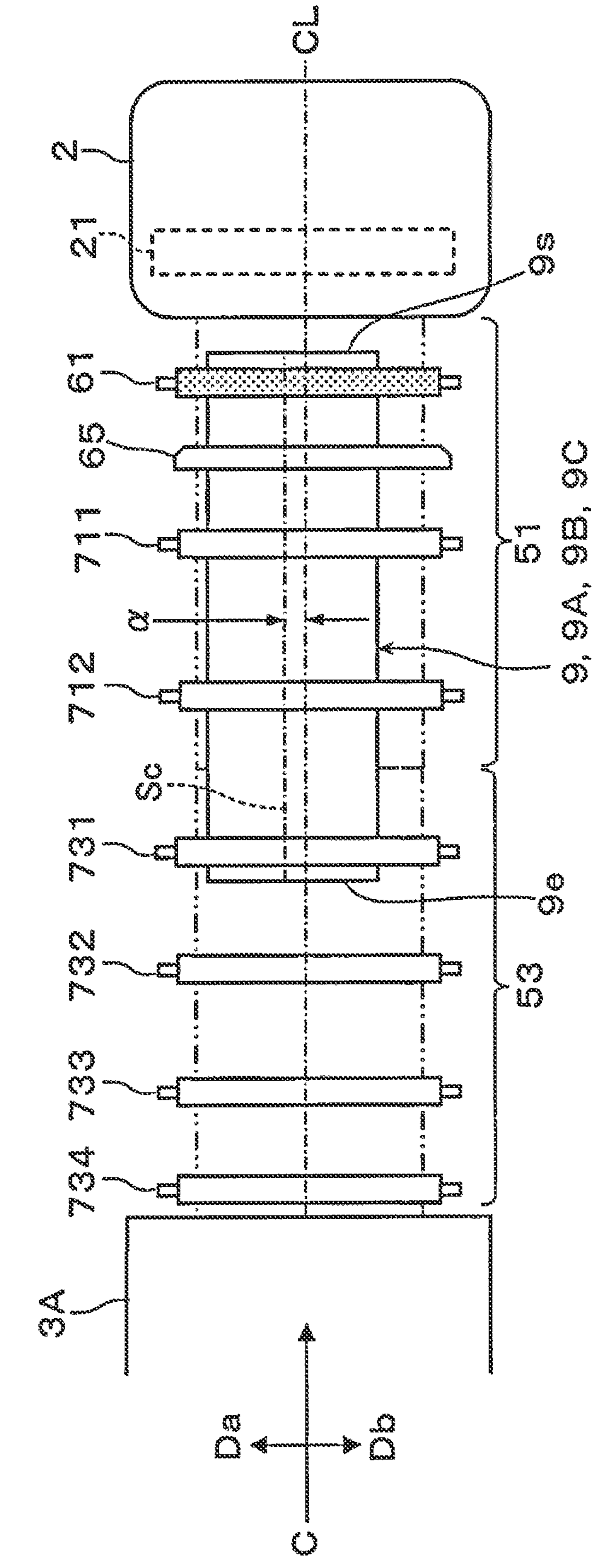
FIG. 7A is a diagram illustrating the transportation state of a sheet transported while being deviated in an axial direction.

Operation of Correcting Deviation in Axial Direction During Sheet Transportation As illustrated in FIG. 7A, the sheet transport device 5 may transport, along the final transport path 51, the sheet 9 (9A, 9B, or 9C) with a deviation in the axial direction D with respect the transportation reference line CL.

For example, the sheet transport device 5 illustrated in FIG. 7A employs a center registration method for performing a transportation operation while using the center position of the final transport path 51 in the axial direction D as the transportation reference line CL, and aligning the center position of the sheet 9 in the width direction with the transportation reference line CL. FIG. 7A illustrates an example case where the sheet 9 fed from the first feeder 3A is transported to the final transport path 51 through the first transport path 53. A dot-and-dash line Sc in FIG. 7A and other drawings indicates the center line connecting the center of the sheet 9 in the width direction while being transported.

Figure 7B:
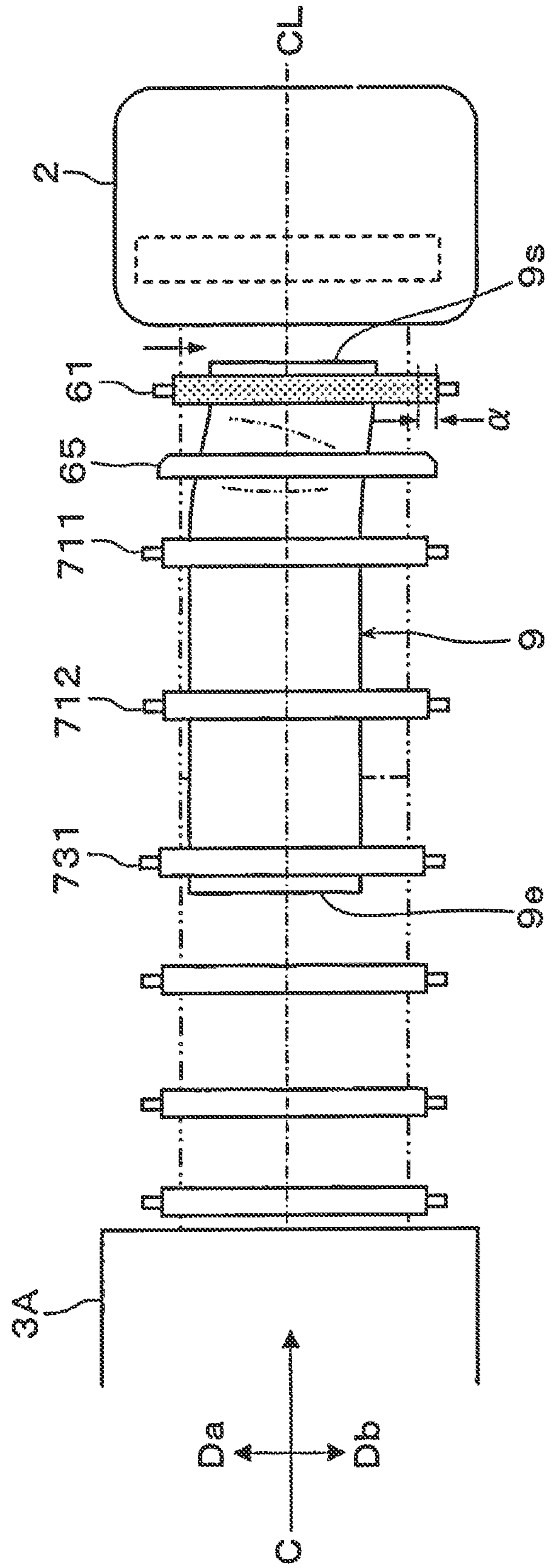
FIG. 7B is a diagram illustrating the state of a sheet when a pair of movable transport rollers is moved.

In contrast, in the sheet transport device 5, when the misregistration detector 65 detects a deviation amount $\alpha$ in the axial direction D, the pair of movable transport rollers 61 moves in the intended direction Da or Db of the axial direction D by an intended distance $\alpha$ while holding the sheet 9 to correct the deviation amount $\alpha$. FIG. 7B illustrates an example case where the pair of movable transport rollers 61 has moved in the intended direction Db of the axial direction D.

Figure 13A:
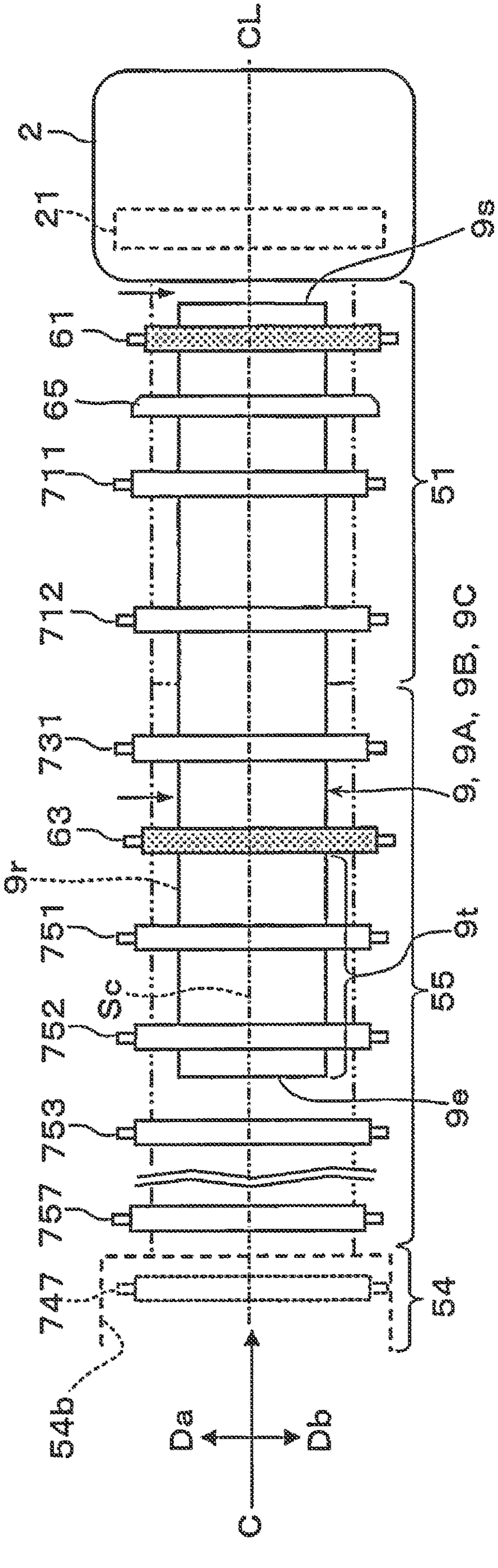
FIG. 13A is a diagram illustrating the state of a sheet when the transportation operation in FIG. 12 is performed.

In the sheet transport device 5, when the deviation amount $\alpha$, in the axial direction D, of the sheet 9 re-transported from the re-transport path 55 to the final transport path 51 reaches or exceeds a predetermined value M, as illustrated in FIG. 13A, the two pairs of movable transport rollers 61 and 63 move by the intended distance $\alpha$ in the intended direction Da or Db of the axial direction D while holding the sheet 9 to correct the deviation amount $\alpha$. FIG. 13A also illustrates a case where the two pairs of movable transport rollers 61 and 63 have moved in the intended direction Db of the axial direction D.

Figure 20A:
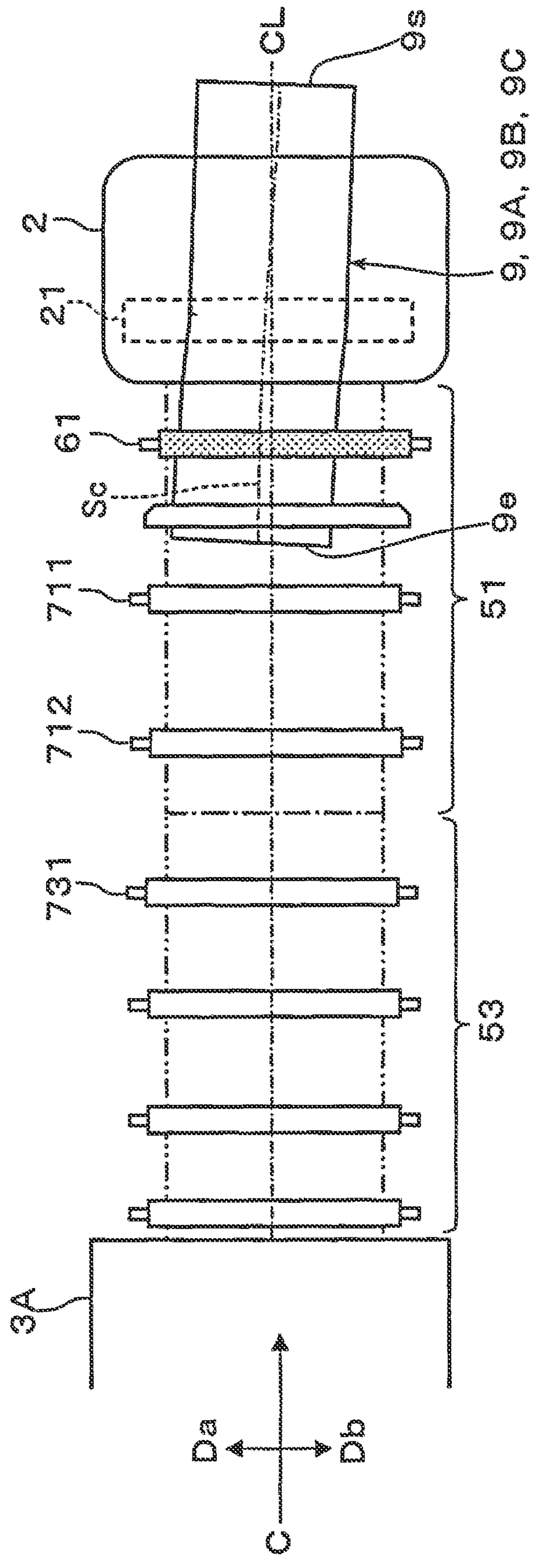
FIG. 20A is a diagram illustrating an example state of a transportation failure when the transportation operation is kept after simply moving a pair of movable transport rollers.

When the sheet transport device 5 that performs this movement operation keeps performing the transportation operation while the pair of movable transport rollers 61 is simply moved in the axial direction D by the intended distance $\alpha$, the sheet 9 may cause a transportation failure as illustrated in FIG. 20A.

More specifically, in this case, a portion (a trailing-end portion during transportation) of the sheet 9 that is passing through some of the multiple pairs of first transport rollers 711, 712, and 731 disposed upstream from the pair of movable transport rollers 61 in the transportation direction C may be skewed or distorted when the pair of movable transport rollers 61 is moved.

Figure 20B:
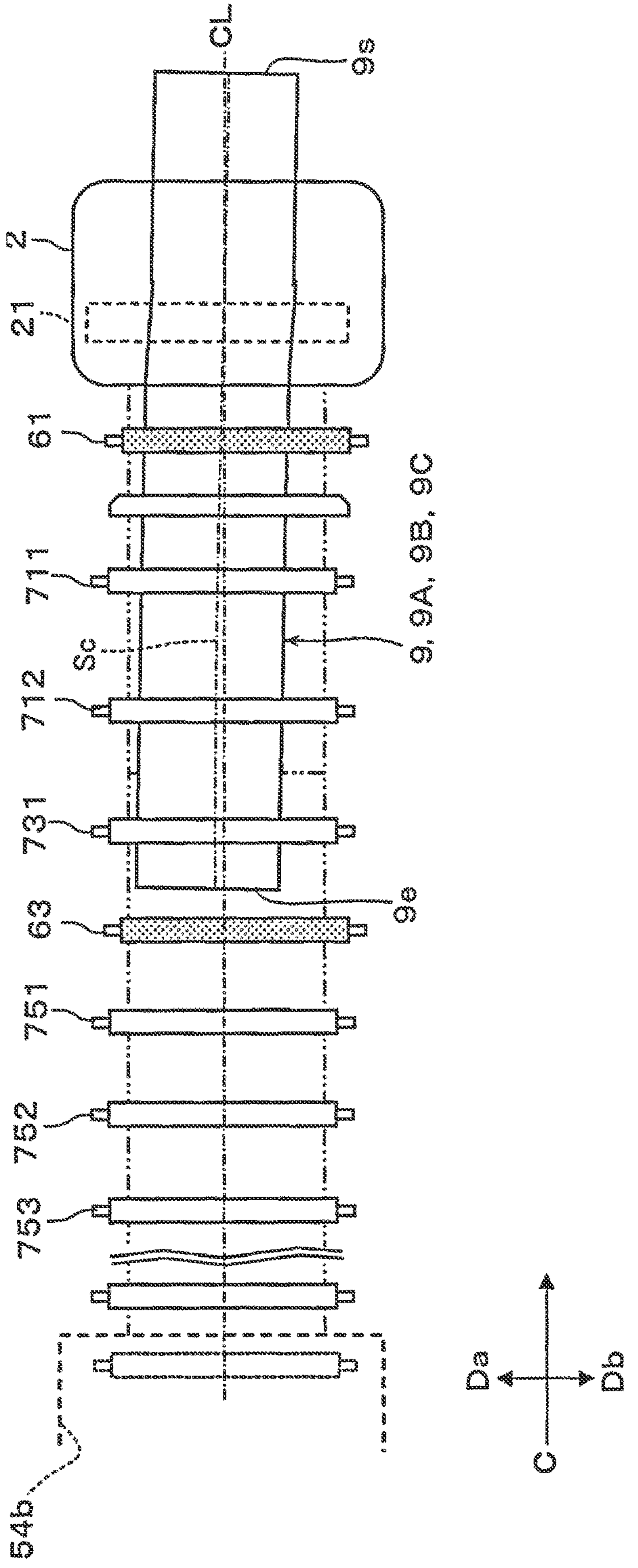
FIG. 20B is a diagram illustrating an example state of a transportation failure caused when the transportation operation is kept after simply moving two pairs of movable transport rollers.

Also when the sheet transport device 5 keeps performing the transportation operation while the two pairs of movable transport rollers 61 and 63 are simply moved in the axial direction D by the intended distance $\alpha$, the sheet 9 may cause a transportation failure as illustrated in FIG. 20B.

In this case, a portion of the sheet 9 that is passing through some of the multiple pairs of third transport rollers 751, 752, and 753 disposed upstream from the upstream pair of movable transport rollers 63 in the transportation direction C may be skewed or distorted when the pairs of movable transport rollers 61 and 63 are moved.

Also in these cases, the trailing-end portion of the sheet 9 passes through the pair of movable transport rollers 61 while being skewed or distorted, and then is introduced into and passes through the image transfer portion 21 in the image forming portion 2. Thus, the image forming apparatus 1 fails to correctly form an image on the sheet 9 at an intended position.

Structure Relating to Transportation Operation for Moving Pair of Movable Transport Rollers As illustrated in FIG. 8 to FIG. 10B, in the sheet transport device 5 according to the first exemplary embodiment, when the pair of movable transport rollers 61 is moved in the axial direction D, any two transport rollers in at least one of the pairs of first transport rollers 711 and 712 and the pairs of transport rollers 731 to 734 disposed upstream from the pair of movable transport rollers 61 in the transportation direction C are separated not to hold at least part of the portion 9*t* of the transported sheet located upstream from the pair of movable transport rollers 61.

As illustrated in FIG. 11 to FIG. 13B, in the sheet transport device 5, when the two pairs of movable transport rollers 61 and 63 are moved in the axial direction D, any two transport rollers in at least one of the pairs of third transport rollers 751 to 757 disposed upstream from the upstream pair of movable transport rollers 63 in the transportation direction C are separated not to hold at least part of the portion 9*t* of the transported sheet located upstream from the upstream pair of movable transport rollers 63.

The at least one pair of first transport rollers that are separated is the pair of first transport rollers located to hold the portion 9*t* of the sheet located upstream from the pair of movable transport rollers 61.

Figure 10A:
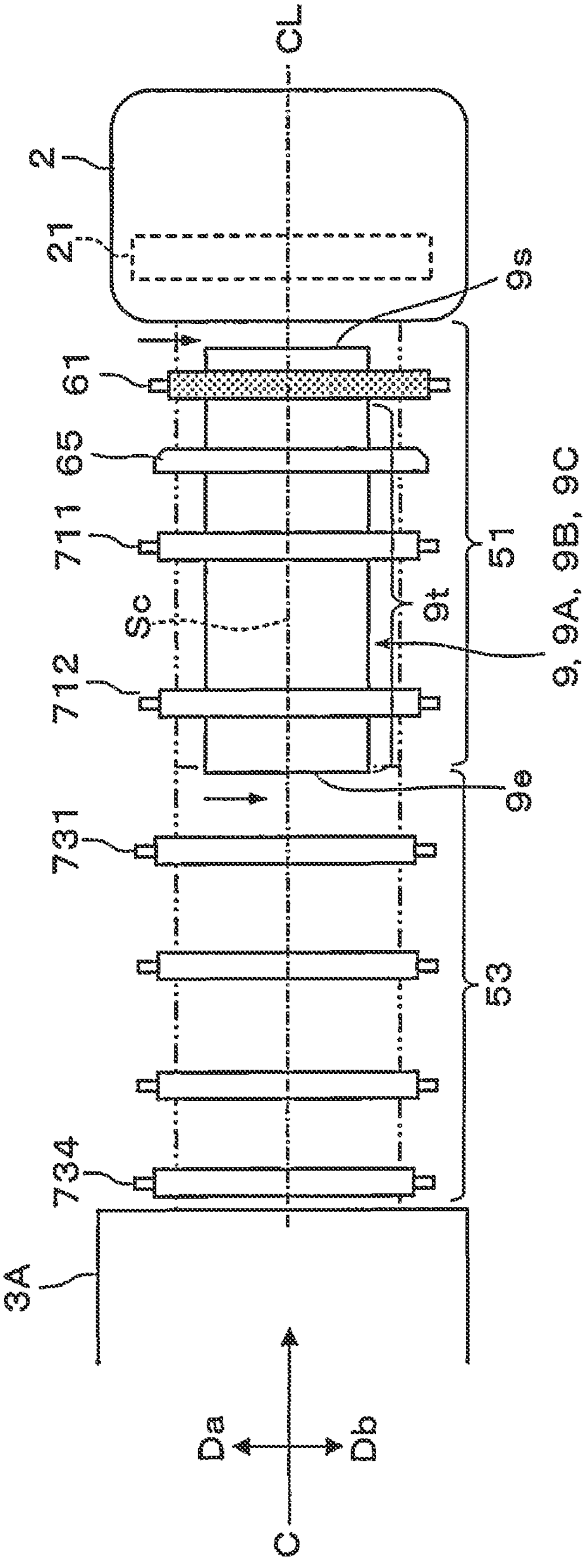
FIG. 10A is a diagram illustrating the sheet transportation state when the transportation operation in FIG. 9 is performed.
Figure 10B:
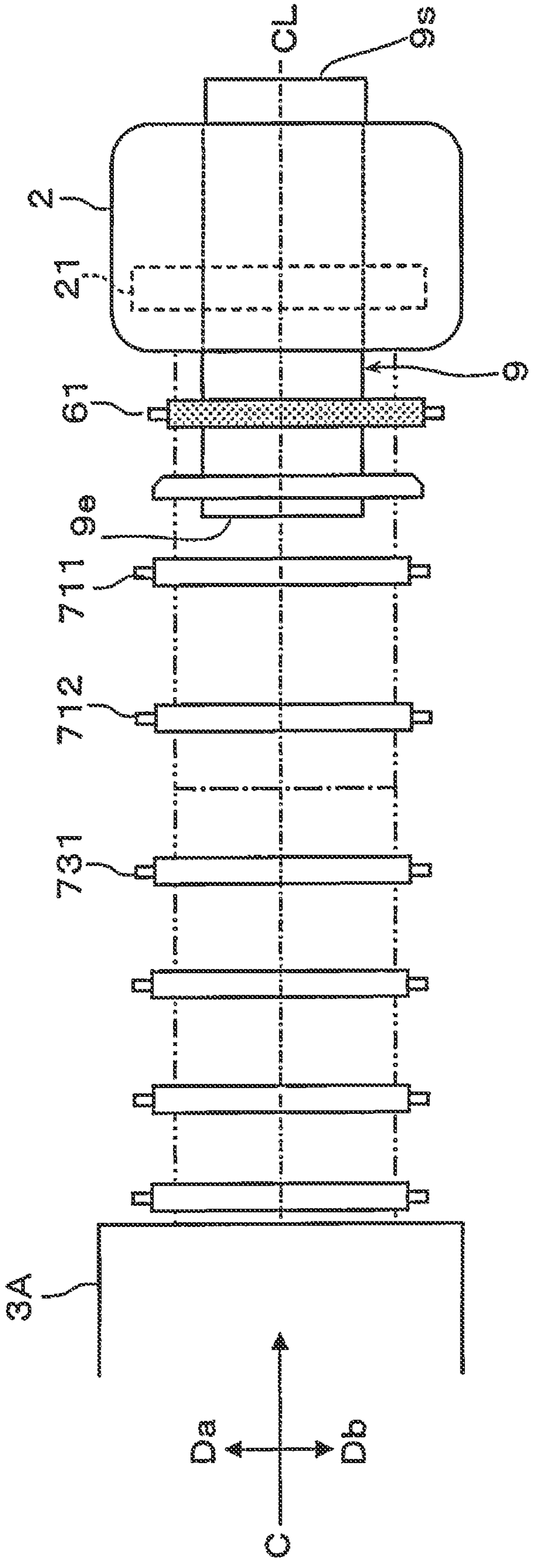
FIG. 10B is a diagram illustrating the state where a trailing end of the sheet in FIG. 10A passes through a most downstream one of the pairs of first transport rollers.

In this case, as illustrated in FIGS. 10A and 10B, the portion 9*t* of the sheet transported through a transportation section located upstream from the pair of movable transport rollers 61 in the transportation direction C is to be held by the pairs of first transport rollers 711 and 712.

Thus, in the assumed case illustrated in FIGS. 10A and 10B, the at least one pair of first transport rollers that are separated from each other not to hold the portion 9*t* of the transported sheet corresponds to both the pairs of first transport rollers 711 and 712.

The at least one pair of third transport rollers that are separated corresponds to the pair of first transport rollers located to hold the portion 9*t* of the sheet located upstream from the upstream pair of movable transport rollers 63.

Figure 13B:
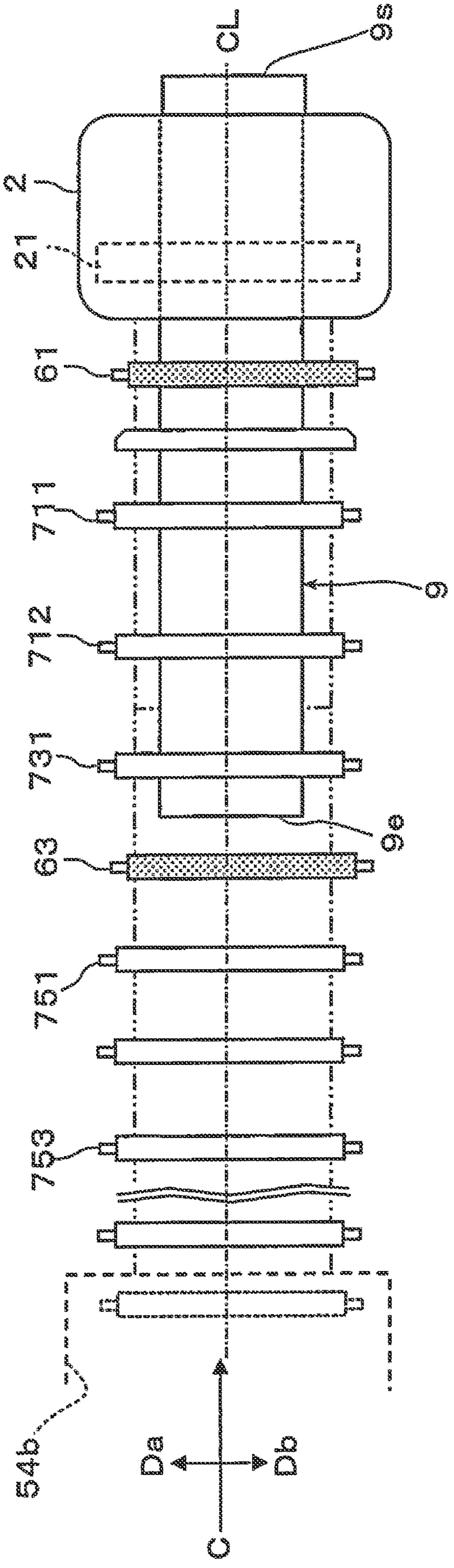
FIG. 13B is a diagram illustrating the state where a trailing end of the sheet in FIG. 13A passes through a most downstream one of the pairs of third transport rollers.

In this case, as illustrated in FIGS. 13A and 13B, the portion 9*t* of the sheet transported through a transportation section located upstream from the upstream pair of movable transport rollers 63 in the transportation direction C is to be held by the pairs of third transport rollers 751 and 752.

Thus, in the assumed case illustrated in FIGS. 13A and 13B, the at least one pair of third transport rollers that are separated from each other not to hold the portion 9*t* of the transported sheet corresponds to both the pairs of third transport rollers 751 and 752.

When the pair of movable transport rollers 61 is moved in the axial direction D, in the sheet transport device 5, the controller 13 calculates and grasps, based on the information relating to, for example, the size of the sheet 9 and the distance from the pair of movable transport rollers 61 to each pair of first transport rollers, the pair of first transport rollers that is to hold the portion 9*t* of the transported sheet upstream from the pair of movable transport rollers 61.

When the two pairs of movable transport rollers 61 and 63 are moved in the axial direction D, in the sheet transport device 5, the controller 13 calculates and grasps, based on the information relating to, for example, the size of the sheet 9, the distance from the pair of movable transport rollers 61 to the pair of movable transport rollers 63, and the distance from the pair of movable transport rollers 61 to each pair of third transport rollers, the pair of third transport rollers that is to hold the portion 9*t* of the transported sheet upstream from the upstream pair of movable transport rollers 63.

The distance by which the driving rollers and the driven rollers in each pair of the first or third transport rollers that are to be separated are separated from each other may be a distance that forms a space that allows the sheet 9 to move therethrough as appropriate in the axial direction without the holding force of each pair of the transport rollers being exerted on the transported sheet 9.

Transportation Operation of Sheet Transport Device

Subsequently, the transportation operation of the sheet transport device 5 will be roughly described.

Figure 8:
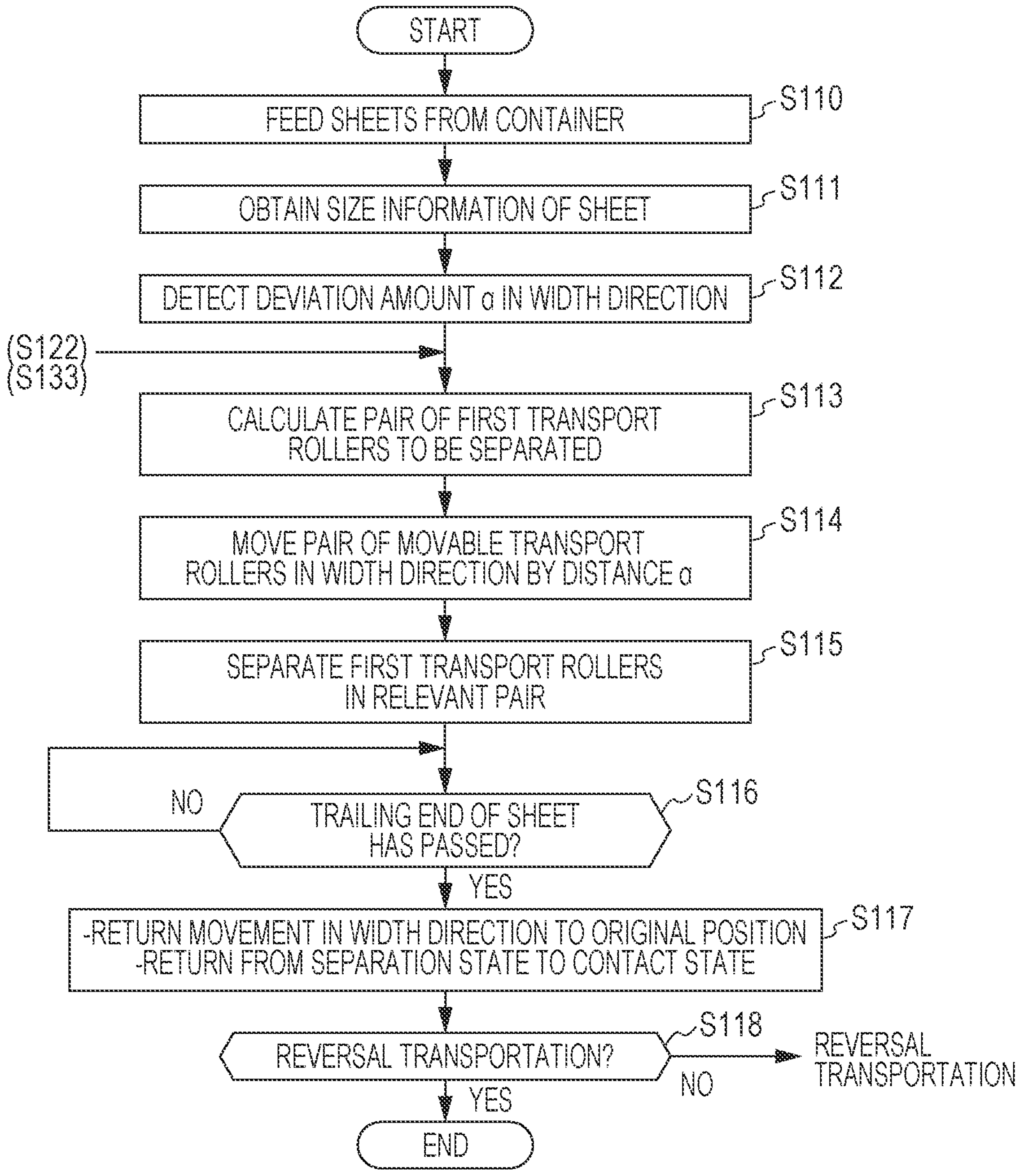
FIG. 8 is a flowchart of a transportation operation not including reversal transportation.

When the image forming apparatus 1 performs image formation, the sheet transport device 5 feeds sheets 9 of the type and the size appropriate for the image formation from the sheet container of each transportation start portion 3 accommodating the sheets 9 (Step S110 in FIG. 8). Although the first exemplary embodiment describes, with reference to the drawings, a case where a sheet 9 (9A) is fed from the first feeder 3A for convenience, the sheet 9 to be fed is not limited to the sheet 9A fed from the first feeder 3A.

The sheet 9 (9A) fed from the first feeder 3A is transported to the final transport path 51 through the first transport path 53. The sheet 9 illustrated in FIGS. 7A and 7B and the following drawings is any of the sheets 9A, 9B, and 9C.

Subsequently, the controller 13 obtains the size information of the sheet 9 (Step S111), and, when the sheet 9 passes the final transport path 51, the misregistration detector 65 detects the deviation amount α of the sheet 9 in the axial direction D (Step S112).

The deviation amount α is detected after the leading end 9*s* of the sheet 9 has passed a measurement area of the misregistration detector 65. The information detected by the misregistration detector 65 is transmitted to the controller 13. During detection of the deviation amount α, the transportation operation at the first transport path 53 and the final transport path 51 is temporarily stopped.

The leading end 9*s* of the sheet 9 transported to the final transport path 51 abuts against a portion between the pair of movable transport rollers 61 and is corrected to be parallel to the axial direction D. Then, the sheet 9 is slightly transported to be held between the pair of movable transport rollers 61.

Substantially concurrently with the detection of the deviation amount α in Step S112, the controller 13 calculates the pair of first transport rollers to be separated (Step S113).

In the first exemplary embodiment, as described above, the controller 13 calculates the pairs of first transport rollers 711 and 712 located to hold the portion 9*t* of the sheet.

When the deviation amount α is detected in Step S112, the pair of movable transport rollers 61 is moved in the axial direction D by the intended distance α (Step S114). The pair of movable transport rollers 61 is moved by the controller 13 controlling driving of the driving motor 617M via the roller-pair movement driving controller 502.

Concurrently with or immediately before the pair of movable transport rollers 61 starts the moving operation, the first transport rollers 711 and 712 in the pairs to be separated are separated (Step S115). The separation is performed by the controller 13 controlling driving of the driving motors 709M1 and 709M2 in the separating device 708 via the roller-pair separation driving controller 503.

After the movement of the pair of movable transport rollers 61 and the separation of the pairs of first transport rollers 711 and 712, as illustrated in FIG. 10A, the sheet 9 is moved in the axial direction D while being held by the pair of movable transport rollers 61.

At this time, the portion 9*t* of the transported sheet 9 is released without being held by the pairs of first transport rollers 711 and 712 and left movable. Thus, as illustrated in FIG. 10A, the entirety of the sheet 9 is moved in the axial direction D by the same distance in synchronization with the pair of movable transport rollers 61.

Thus, the center line Sc of the sheet 9 transported while being deviated in the axial direction D is substantially aligned with the transportation reference line CL, and the deviation in the axial direction D is corrected.

After the movement of the pair of movable transport rollers 61 at this time is finished, the transportation operation at the sheet transport path such as the first transport path 53 and the final transport path 51 is restarted.

Thus, the sheet 9 is transported to be fed to the image forming portion 2 while being held by only the pair of movable transport rollers 61 with the deviation in the axial direction D corrected.

Subsequently, after the transportation operation at, for example, the first transport path 53 and the final transport path 51 is restarted, the controller 13 determines whether the trailing end 9*e* of the sheet 9A has passed through the pair of movable transport rollers 61 (Step S116).

At this time, the first passage sensor 59*a* detecting the trailing end 9*e* determines that the trailing end 9*e* of the sheet 9 has passed through the pair of movable transport rollers 61.

When the controller 13 determines in Step S116 that the trailing end 9*e* of the sheet 9 has passed through the pair of movable transport rollers 61, the controller 13 returns the pair of movable transport rollers 61 to the original position (the reference position in the normal state) before transportation, and returns the separated first transport rollers 711 and 712 in the pairs to the contact position in the normal state (Step S117).

Thus, the sheet transport device 5 is prepared for the next transportation operation.

Subsequently, the controller 13 determines whether the sheet 9 is to undergo reversal transportation (Step S118).

When the controller 13 determines that the sheet 9 is not to undergo reversal transportation in Step S118, the transportation operation on the sheet 9 is finished.

In this case, the sheet 9 having an image formed on one side is transported through the discharging path 52, and finally accommodated in the discharging portion 11.

Transportation Operation Including Reversal Transportation

When the controller 13 determines that the sheet 9 is to undergo reversal transportation in Step S119, the reversal transportation is subsequently performed.

In the reversal transportation, first, the sheet 9 having an image formed on one surface after passing through the image forming portion 2 is guided by the destination switching member 58*a* from a portion of the discharging path 52 to the reversal path 54.

At this time, the sheet 9 is transported through the drawing path 54*a* of the reversal path 54 and fed to the reversal discharging path 54*b* in a forward direction indicated with arrow Cf (refer to FIG. 2 and FIG. 12). At this time, the sheet 9 is temporarily stopped in the reversal discharging path 54*b* when the trailing end 9*e* of the sheet 9 is detected by the third passage sensor 59*c*.

Subsequently, the sheet 9 transported to the reversal path 54 is transported in a reverse direction (refer to FIG. 2 and FIG. 12) indicated with arrow Cr while having the trailing end 9*e* of the sheet 9 serving as the leading end with reversal rotation of the pair of transport rollers 744 at the reversal discharging path 54*b* (Step S120 in FIG. 11). In this case, the reversal path 54 (or the reversal discharging path 54*b* of the reversal path 54) serves as the transportation start portion of the sheet 9.

Thus, the sheet 9 is fed to the re-transport path 55 while being inverted. Thereafter, the inverted sheet 9 is transported to the final transport path 51 through the re-transport path 55.

Subsequently, when the inverted sheet 9 passes the final transport path 51, the controller 13 detects, with the misregistration detector 65, the deviation amount α of the sheet 9 in the axial direction D (Step S121).

Subsequently, the controller 13 determines whether the sheet 9 has a length held by the upstream pair of movable transport rollers 63 (Step S122).

Figure 11:
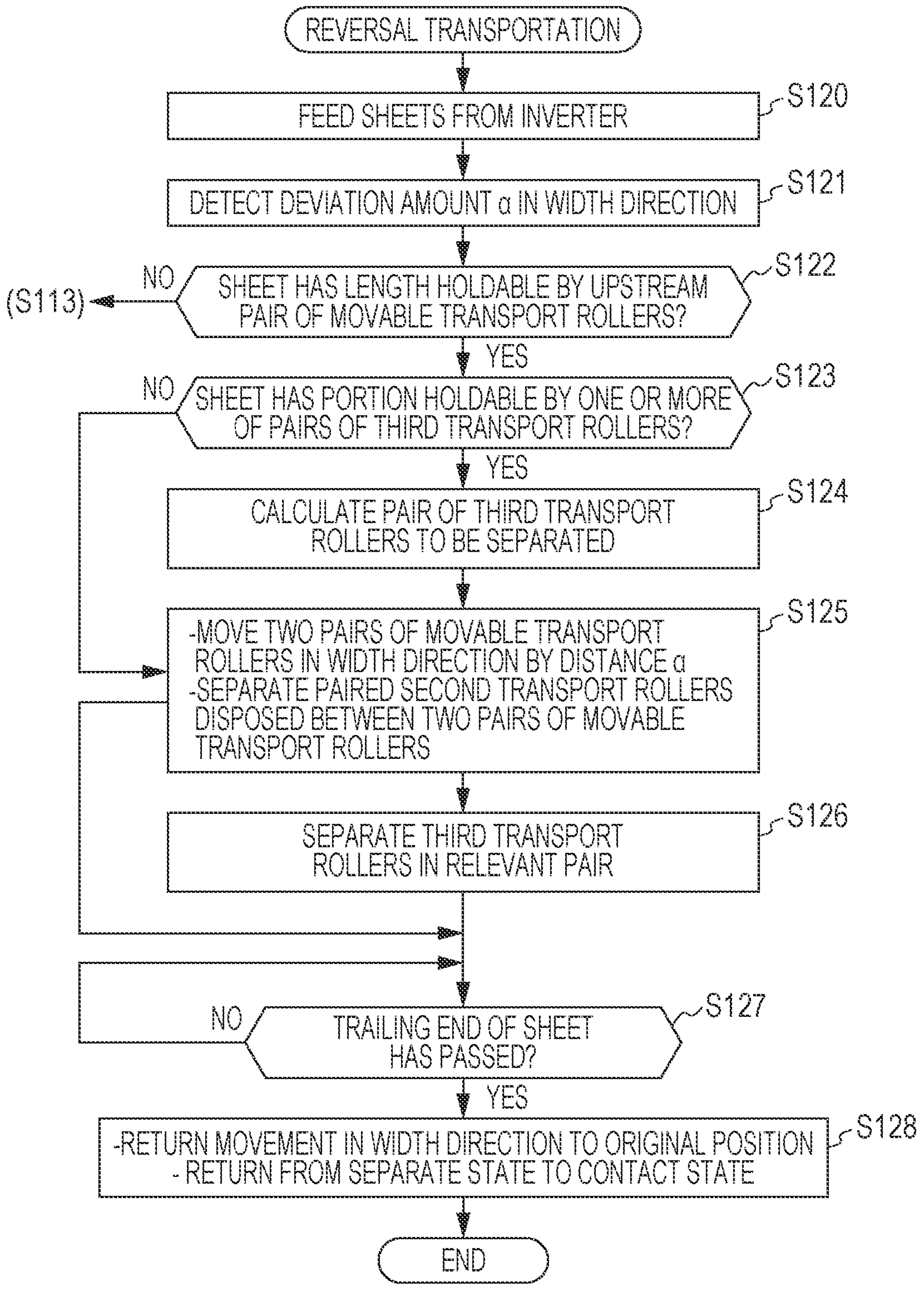
FIG. 11 is a flowchart of the transportation operation including reversal transportation.

When the controller 13 determines in Step S122 that the sheet 9 has a length held by the downstream pair of movable transport rollers 61, but not held by the upstream pair of movable transport rollers 63, the processing proceeds to Step S114 (refer to FIG. 8) as illustrated in FIG. 11.

In this case, the sheet 9 undergoes the transportation operation in Steps S114 to S118 illustrated in FIG. 8.

On the other hand, when the controller 13 determines in Step S122 that the sheet 9 has a length held by the upstream pair of movable transport rollers 63, the controller 13 determines whether the sheet 9 has the portion (trailing-end portion during transportation) 9*t* held by one or more of the pairs of third transport rollers 751 to 757 (Step S123).

When the controller 13 determines in Step S123 that the sheet 9 has a portion held by one or more of the pairs of third transport rollers 751 to 757, the controller 13 calculates the pair of third transport rollers that is to be separated (Step S124). At this time, the sheet 9 is a sheet with a large length to be held by the two pairs of movable transport rollers 61 and 63 and one or more of the pairs of third transport rollers 751 to 757.

In the first exemplary embodiment, as described above, the pairs of third transport rollers 751 and 752 located to hold the portion 9*t* of the sheet are calculated.

After the calculation in Step S124 is finished, the two pairs of movable transport rollers 61 and 63 are moved in the axial direction D by the intended distance α, and the paired second transport rollers 711, 712, and 731 disposed between the two pairs of movable transport rollers 61 and 63 are separated (Step S125).

The two pairs of movable transport rollers 61 and 63 are moved by the controller 13 controlling driving of the driving motors 617M and 637M in the moving device 637 through the roller-pair movement driving controller 502. The paired second transport rollers 711, 712, and 731 are separated by the controller 13 controlling driving of the driving motors 709M1, 709M2, and 709M3 in the separating device 708 through the roller-pair separation driving controller 503.

When the two pairs of movable transport rollers 61 and 63 are moved, the paired second transport rollers 711, 712, and 731 are separated.

Thus, the portion of the sheet 9 held by the two pairs of movable transport rollers 61 and 63 is no longer held by the pairs of second transport rollers 711, 712, and 731, and smoothly moved in the axial direction D with the moving operations of the two pairs of movable transport rollers 61 and 63.

Concurrently with or immediately before the two pairs of movable transport rollers 61 and 63 start the moving operations, the pairs of third transport rollers 751 and 752 to be separated are separated (Step S126). This separation is performed by the controller 13 controlling the driving of the driving motors 709M5 and 709M6 in the separating device 708 with the roller-pair separation driving controller 503.

After the movement of the two pairs of movable transport rollers 61 and 63, the separation of pairs of second transport rollers 711, 712, and 731, and the separation of the pairs of first transport rollers 711 and 712, the sheet 9 is moved in the axial direction D while being held by the two pairs of movable transport rollers 61 and 63.

At this time, the portion 9*t* of the transported sheet 9 located upstream from the upstream pair of movable transport rollers 63 is also released without being held by the pairs of third transport rollers 751 and 752 and left movable. Thus, as illustrated in FIG. 13A, the entirety of the sheet 9 is moved in the axial direction D by the same distance in synchronization with the two pairs of movable transport rollers 61 and 63.

Thus, the center line Sc of the sheet 9 transported while being deviated in the axial direction D is substantially aligned with the transportation reference line CL, and the deviation in the axial direction D is corrected.

After the movement of the two pairs of movable transport rollers 61 and 63 at this time is finished, the transportation operation at the sheet transport path such as the re-transport path 55, the first transport path 53, and the final transport path 51 is restarted.

Thus, the sheet 9 is transported to be fed to the image forming portion 2 while being held by the two pairs of movable transport rollers 61 and 63 with the deviation in the axial direction D corrected, and then finally held by only the pair of movable transport rollers 61 and fed from the final transport path 51.

Subsequently, after the transportation operation at a sheet transport path such as the re-transport path 55 and the final transport path 51 is restarted, the controller 13 determines whether the trailing end 9*e* of the sheet 9A has passed through the pair of movable transport rollers 61 (Step S127).

At this time, the first passage sensor 59*a* detecting the trailing end 9*e* determines that the trailing end 9*e* of the sheet 9 has passed through the pair of movable transport rollers 61.

When the controller 13 determines in Step S123 that the sheet 9 has no portion held by one or more of the pairs of third transport rollers 751 to 757, as illustrated in FIG. 11, the processing proceeds to the operation in Step S125 instead of proceeding to the operation in Step S124.

In this case, after the operation in Step S125 is finished, as illustrated in FIG. 11, the processing proceeds to the operation in Step S127 instead of proceeding to the operation in Step S126.

When the controller 13 determines in Step S127 that the trailing end 9*e* of the sheet 9 has passed through the pair of movable transport rollers 61, the controller 13 returns the two pairs of movable transport rollers 61 and 63 to the original position (the reference position in the normal state) before movement, and returns the separate state of the pairs of second transport rollers 711, 712, and 731 and the pairs of third transport rollers 751 and 752 to the contact position in the normal state (Step S128).

Thus, the sheet transport device 5 is prepared for the next transportation operation.

With the above operation, the sheet 9 that is inverted by undergoing reversal transportation has an image formed thereon by the image forming portion 2 on the back surface. The sheet 9 having an image formed on the back surface is transported through the discharging path 52, and finally accommodated in the discharging portion 11.

As described above, when moving the sheet 9 in the axial direction D with the pair of movable transport rollers 61 or the two pairs of movable transport rollers 61 and 63, the sheet transport device 5 reduces skewing or distortion of the portion 9*t* of the sheet that is passing through, for example, all of or one or more of the multiple pairs of first transport rollers 711 and 712 or the pairs of third transport rollers 751 and 752 disposed upstream from the pairs of movable transport rollers 61 and 63.

More specifically, the sheet transport device 5 further reduces skewing or distortion of the portion 9*t* of the transported sheet than in the case of transporting the sheet 9 without separating the multiple pairs of first transport rollers or the pairs of third transport rollers while the multiple pairs of first transport rollers or the pairs of third transport rollers are holding the portion 9*t* of the transported sheet.

In the sheet transport device 5, all the pairs of first transport rollers (711 and 712) holding the portion 9*t* of the sheet located upstream from the pair of movable transport rollers 61 are separable pairs of first transport rollers. In addition, all the pairs of third transport rollers (751 and 752) holding the portion 9*t* of the sheet located upstream from the upstream pair of movable transport rollers 63 are separable pairs of third transport rollers.

Compared to the case where only one of the pairs of first transport rollers (for example, only the pair of first transport rollers 711) holding the portion 9*t* of the sheet located upstream from the pair of movable transport rollers 61 is at least one pair of first transport rollers that are separated, or where only one of the pairs of third transport rollers (for example, only the pair of third transport rollers 751) that holds the portion 9*t* of the sheet located upstream from the upstream pair of movable transport rollers 63 is at least one pair of third transport rollers that are separated, the sheet transport device 5 further reduces skewing or distortion of the portion 9*t* of the sheet.

When the sheet transport device 5 moves the pair of movable transport rollers 61 or the two pairs of movable transport rollers 61 and 63 in the axial direction D, the image forming apparatus 1 including the sheet transport device 5 reduces skewing or distortion of the portion of the sheet 9 that is passing all of or one or more of, for example, the multiple pairs of first transport rollers 711 and 712 or the pairs of third transport rollers 751 to 757. Thus, the image forming apparatus 1 facilitates normal image formation on the sheet 9 at the image forming portion 2.

In the image forming apparatus 1, the sheet transport device 5 includes the re-transport path 55. Compared to the case where the sheet transport device 5 does not include the re-transport path 55, the sheet transport device 5 facilitates alignment of the position of an image formed by the image forming portion 2 on the back surface of the sheet 9 transported from the reversal path 54 serving as a sheet inverter with the position of an image formed on the front surface of the sheet 9 by the image forming portion 2.

Second Exemplary Embodiment

FIG. 14 to FIG. 19B illustrate, for example, a sheet transport device 5 according to a second exemplary embodiment.

As will be described below, the sheet transport device 5 according to the second exemplary embodiment and the sheet transport device 5 according to the first exemplary embodiment have the same structure except for a portion of the transportation operation.

Thus, in the following description and the drawings, the same components are denoted with the reference signs the same as those in the first exemplary embodiment without being described unless needed.

In the sheet transport device 5 according to the second exemplary embodiment, at least one of the pairs of first transport rollers including the most downstream pair of first transport rollers 711 located most downstream of the pairs of first transport rollers 711 and 712 holding the portion 9*t* of the sheet located upstream from the pair of movable transport rollers 61 is a pair of first transport rollers that are separated. In this case, the sheet transport device 5 transports the portion 9*t* of the sheet in a bent state in the transport space 50 between the pairs of unseparable first transport rollers holding the portion 9*t* of the sheet located upstream from the at least one pair of first transport rollers that are separated, by producing a difference in transport rate between the pairs of unseparable first transport rollers.

Figure 14:
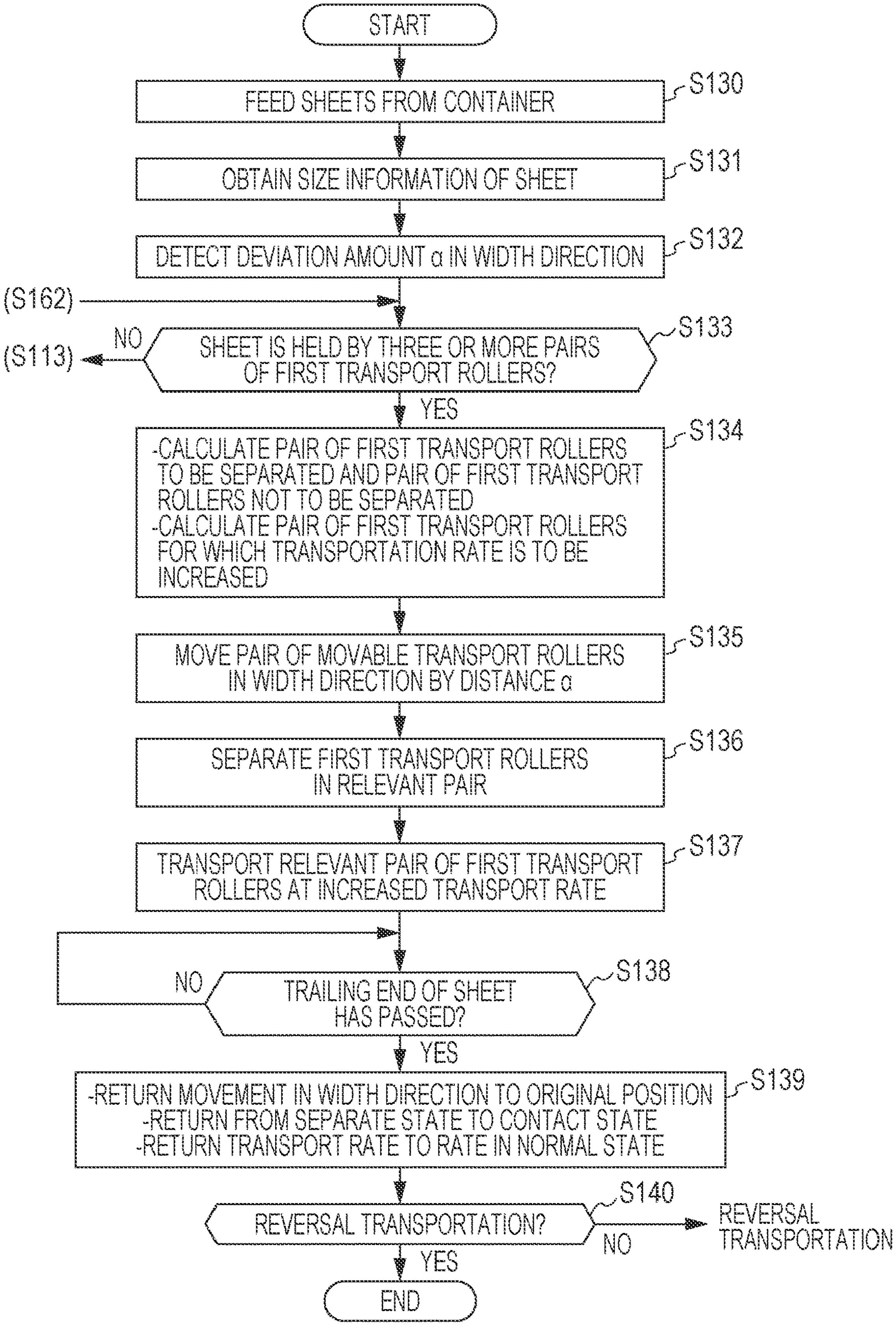
FIG. 14 is a flowchart of the transportation operation not including reversal transportation according to a second exemplary embodiment.
Figure 15:
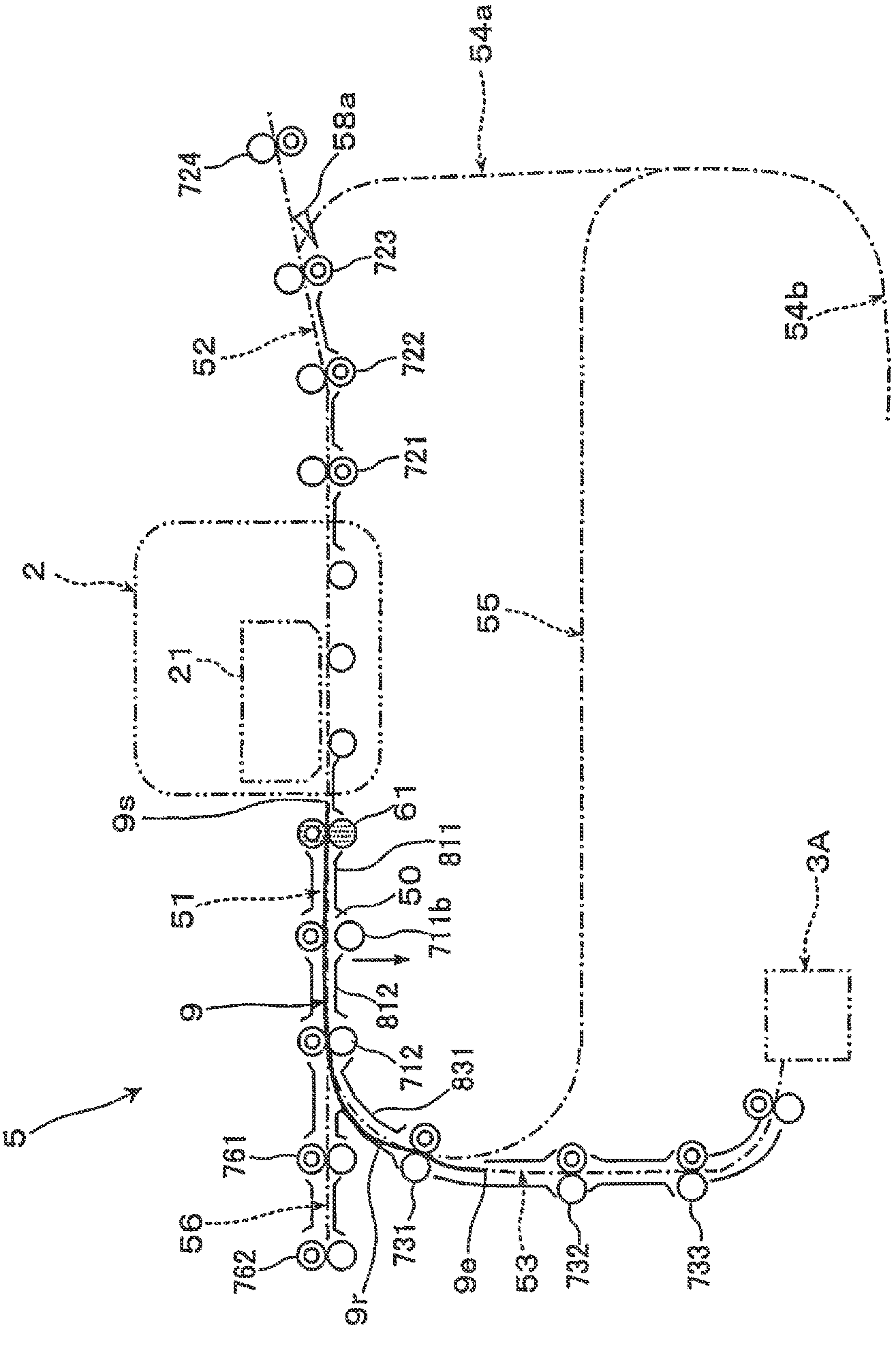
FIG. 15 is a schematic diagram of a related portion of the sheet transportation state corresponding to the transportation operation performed when a pair of movable transport rollers is moved.

In the second exemplary embodiment, as illustrated in FIG. 14 and FIG. 15, only the most downstream pair of first transport rollers 711 corresponds to the at least one pair of first transport rollers that are separated, and the second-most and third-most downstream pairs of first transport rollers 712 and 731 correspond to the pairs of unseparable first transport rollers.

In the sheet transport device 5, at least one of the pairs of third transport rollers, including the most downstream pair of third transport rollers 751 located most downstream, holding the portion 9*t* of the sheet located upstream from the upstream pair of movable transport rollers 63 is the at least one pair of third transport rollers that are separated. In this case, the sheet transport device 5 transports the portion 9*t* of the sheet in a bent state in the transport space 50 between the pairs of unseparable third transport rollers holding the portion 9*t* of the sheet located upstream from the at least one pair of third transport rollers that are separated, by producing a difference in transport rate between the pairs of unseparable third transport rollers.

Figure 18:
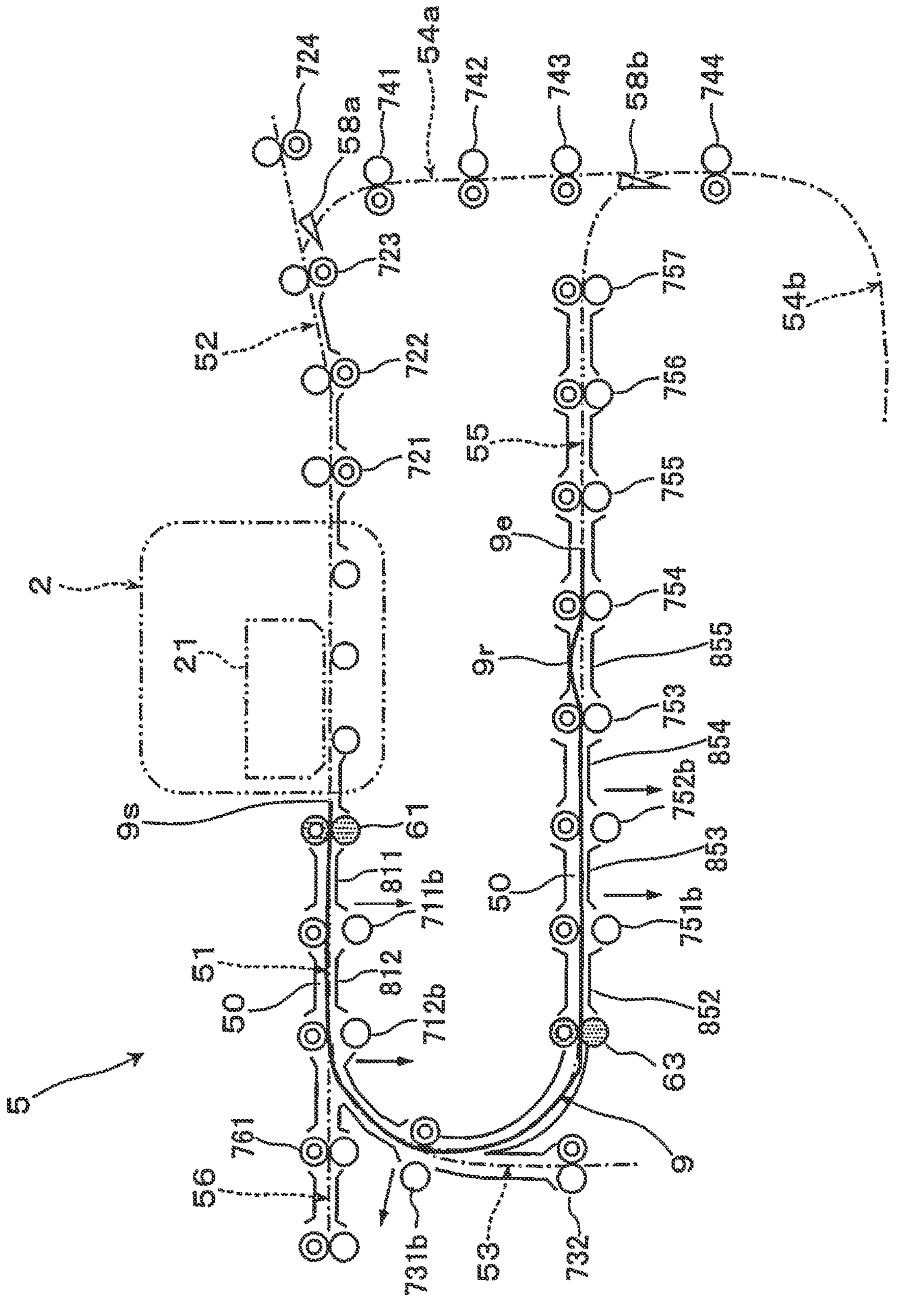
FIG. 18 is a schematic diagram of a related portion of the sheet transportation state corresponding to the transportation operation performed when two pairs of movable transport rollers according to the second exemplary embodiment are moved.

In the second exemplary embodiment, as illustrated in FIG. 18 and FIG. 19, the most downstream pair of third transport rollers 751 and the second-most downstream pair of third transport rollers 752 correspond to the pairs of third transport rollers that are separated, and the third-most and fourth-most downstream pairs of third transport rollers 753 and 754 correspond to the pairs of unseparable third transport rollers.

In the sheet transport device 5, while keeping the transport rate of the most downstream pair of first transport rollers 711 at the transport rate V1 in the normal state, the sheet transport device 5 preliminarily produces a difference in transport rate between the pairs of unseparable first transport rollers 712 and 731 with the transportation driving controller 501 performing a control to change the transport rate of the third-most downstream pair of first transport rollers 731 to a transport rate V2 (>V1) higher than the transport rate V1 in the normal state.

Besides, while keeping the transport rate of the third-most downstream pair of third transport rollers 753 at the transport rate V1 in the normal state, the sheet transport device 5 preliminarily produces a difference in transport rate between the pairs of unseparable third transport rollers 753 and 754 with the transportation driving controller 501 performing a control to change the transport rate of the fourth-most downstream pair of third transport rollers 754 to a transport rate V2 (>V1) higher than the transport rate V1 in the normal state.

The high transport rate V2 of the third-most downstream pair of first transport rollers 731 is set to allow the bent portion of the sheet to be kept away from the transport guides 831 disposed between the pairs of first transport rollers 712 and 731 or to allow the bent portion to slightly touch the transport guides 831. Similarly, the high transport rate V4 of the fourth-most downstream pair of third transport rollers 754 is set to allow the bent portion of the sheet to be kept away from the transport guides 855 disposed between the pairs of third transport rollers 753 and 754 or to allow the bent portion to slightly touch transport guides 855.

Although the high transport rate V2 of the pair of first transport rollers 712 and the high transport rate V4 of the pair of third transport rollers 754 are the same, they may be different from each other.

Transportation Operation of Sheet Transport Device

Subsequently, a transportation operation performed by the sheet transport device 5 according to the second exemplary embodiment will be roughly described.

When the image forming apparatus 1 performs image formation, the sheet transport device 5 feeds the sheets 9 of the type and the size appropriate for the image formation from the sheet container of each transportation start portion 3 accommodating the sheets 9 (Step S130 in FIG. 14). As in the case of the first exemplary embodiment, the second exemplary embodiment describes a case where the sheets 9 (9A) are fed from the first feeder 3A for convenience.

The sheet 9 (9A) fed from the first feeder 3A is transported to the final transport path 51 through the first transport path 53. The sheet 9 illustrated in FIG. 15 and the following drawings is any of the sheets 9A, 9B, and 9C.

Subsequently, the controller 13 obtains size information of the sheet 9 (Step S131), and detects, with the misregistration detector 65, the deviation amount α of the sheet 9 in the axial direction D when the sheet 9 passes the final transport path 51 (Step S132).

Until the result of the detection of the deviation amount α is produced, the transportation operation at the first transport path 53 and the final transport path 51 is temporarily stopped.

Subsequently, the controller 13 determines whether three or more pairs of first transport rollers hold the portion 9*t* of the sheet (Step S133).

When the controller 13 determines in Step S133 that three or more pairs of first transport rollers hold the portion 9*t*, the controller 13 calculates the pair of the first transport rollers that are to be separated and the pair of the first transport rollers that are not to be separated, and calculates the pair of first transport rollers for which the transport rate is to be increased (Step S134).

In the second exemplary embodiment, the pair of first transport rollers holding the portion 9*t* of the sheet includes the three pairs of first transport rollers 711, 712, and 731 based on the above assumption.

In the second exemplary embodiment, the pair of first transport rollers 711 is calculated as the pair of first transport rollers that are to be separated, and the pairs of first transport rollers 712 and 731 are calculated as the pairs of first transport rollers that are not to be separated. In the second exemplary embodiment, the pair of first transport rollers 731 is calculated as the pair of first transport rollers for which the transport rate is increased.

Subsequently, the pair of movable transport rollers 61 is moved in the axial direction D by the intended distance α (Step S135).

Concurrently with or immediately before the start of the movement operation of the pair of movable transport rollers 61, the paired first transport rollers 711 that are to be separated are separated (Step S136), and the transport rate of the pair of first transport rollers 731 that is to be increased is increased (Step S137).

The controller 13 performs the separation operation of the paired first transport rollers 711 by controlling driving of the driving motor 709M1 through the roller-pair separation driving controller 503.

The controller 13 performs the operation of increasing the transport rate of the pair of first transport rollers 731 by controlling driving of the driving motor 709M2 through the transportation driving controller 501.

After these operations are finished, the transportation operation at an appropriate sheet transport path such as the first transport path 53 or the final transport path 51 is restarted.

Figure 16A:
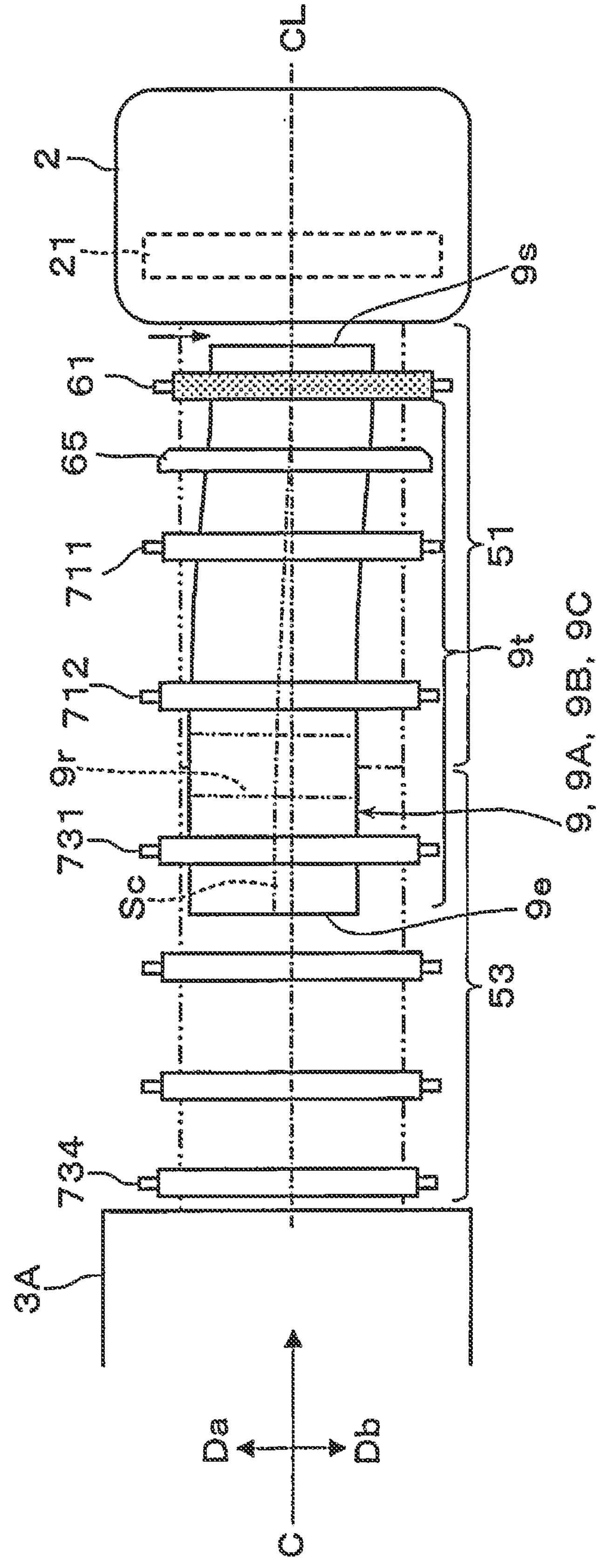
FIG. 16A is a diagram of the state of a sheet when the transportation operation in FIG. 15 is performed.

After the movement of the pair of movable transport rollers 61, the separation of the paired first transport rollers 711, and the increase of the transport rate of the pair of first transport rollers 731 are performed and the sheet 9 is transported, as illustrated in FIG. 15 and FIG. 16A, the sheet 9 is moved in the axial direction D while being held by the pair of movable transport rollers 61 in the transport space 50 upstream from the pair of movable transport rollers 61, and transported while being bent in the transport space 50 between the pairs of first transport rollers 712 and 731.

At this time, the portion 9*t* of the transported sheet is released without being held by the pair of first transport rollers 711 and left movable. The portion 9*t* of the sheet is bent in the transport space 50 between the pairs of first transport rollers 712 and 731 and easily movable.

Thus, as illustrated in FIG. 16A, in the portion 9*t* of the transported sheet, the portion located downstream from the pair of first transport rollers 712 in the transportation direction C starts moving in the axial direction D to substantially follow the movement of the pair of movable transport rollers 61.

In the portion located upstream from the pair of first transport rollers 712 in the transportation direction C, skewing or distortion of the portion 9*t* of the transported sheet passing through the pairs of first transport rollers 712 and 731 is reduced further than in the case where the sheet 9 is transported between the pairs of unseparable first transport rollers 712 and 731 without producing a difference in transport rate between the pairs of unseparable first transport rollers 712 and 731, or transported while being pulled between the pairs of unseparable first transport rollers 712 and 731.

Figure 16B:
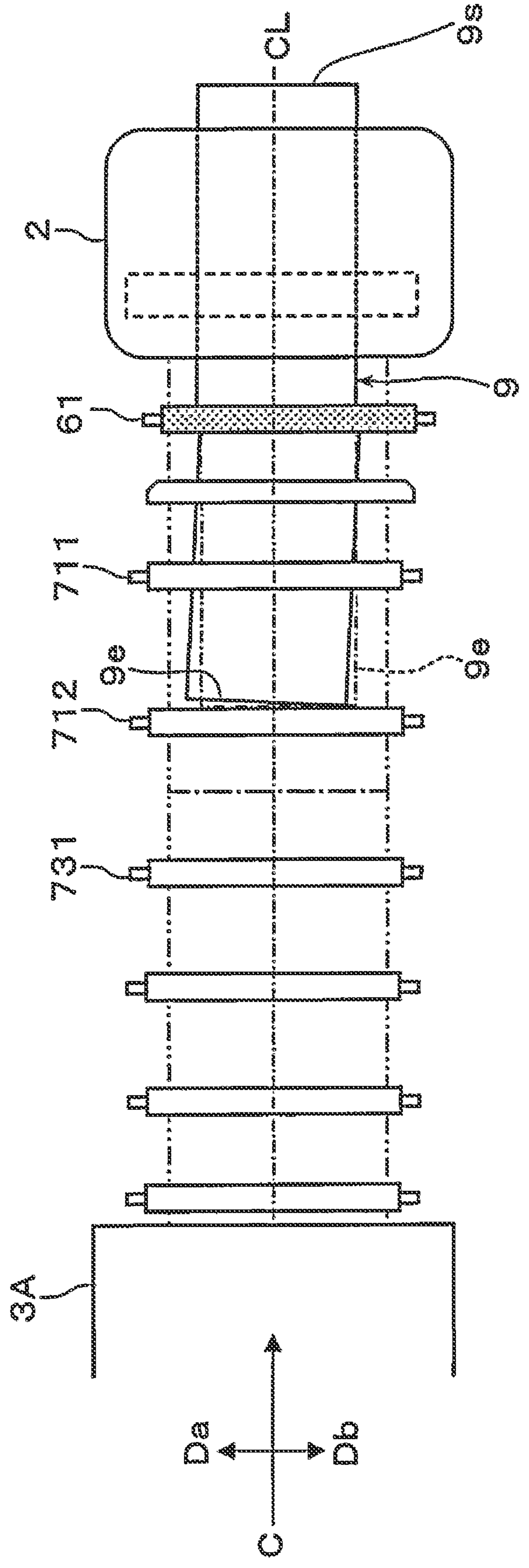
FIG. 16B is a diagram of the state where a trailing end of the sheet in FIG. 16A passes through a second-most downstream one of the pairs of first transport rollers.

As illustrated in FIG. 16B, when the portion 9*t* of the transported sheet is released from the pair of first transport rollers 712 and passes therethrough, the trailing end 9*e* of the sheet 9 moves to the pair of movable transport rollers 61 from the state where the sheet 9 is slightly inclined with respect to the axial direction D as indicated with a solid line in FIG. 16B to the state where the deviation in the axial direction D is corrected as indicated with a two-dot chain line in FIG. 16B.

Thus, the center line Sc of the sheet 9 that has been transported while being deviated in the axial direction D is substantially aligned with the transportation reference line CL, and the deviation in the axial direction D is corrected. Thereafter, the sheet 9 is transported to be finally fed to the image forming portion 2 by the pair of movable transport rollers 61.

When the controller 13 determines in Step S133 that fewer than three pairs of first transport rollers hold the portion 9*t*, the processing fails to proceed to the transportation operation in Step S134 and the following steps. Thus, the processing proceeds to the transportation operation in Step S113 illustrated in FIG. 8.

Subsequently, after the transportation operation at, for example, the first transport path 53 and the final transport path 51 is restarted, the controller 13 determines whether the trailing end 9*e* of the sheet 9A has passed through the pair of movable transport rollers 61 (Step S138).

When the controller 13 has determined in Step S138 that the trailing end 9*e* of the sheet 9 has passed through the pair of movable transport rollers 61, the controller 13 returns the pair of movable transport rollers 61 to the original position (the reference position in the normal state) before the movement, returns the separate state of the most downstream pair of first transport rollers 711 to the contact state where the first transport rollers 711 are in contact with each other, and returns the transport rate of the third-most downstream pair of first transport rollers 731 to the rate (V1) in the normal state (Step S139).

Thus, the sheet transport device 5 is prepared for the next transportation operation.

Subsequently, the controller 13 determines whether the sheet 9 is to undergo reversal transportation (Step S140).

When the controller 13 determines in Step S140 that the sheet 9 is not to undergo reversal transportation, the controller 13 finishes the transportation operation on the sheet 9.

In this case, the sheet 9 having an image formed on one side by the image forming portion 2 is transported through the discharging path 52, and finally accommodated in the discharging portion 11.

Transportation Operation Including Reversal Transportation

On the other hand, when the controller 13 determines in Step S140 that the sheet 9 is to undergo reversal transportation, the reversal transportation is successively performed.

In the reversal transportation, first, the sheet 9 having an image formed on one surface after passing through the image forming portion 2 is guided by the destination switching member 58*a* from a portion of the discharging path 52 to the reversal path 54.

Subsequently, the sheet 9 transported to the reversal path 54 is transported in a reverse direction (refer to FIG. 2 and FIG. 12) indicated with arrow Cr while having the trailing end 9*e* of the sheet 9 serving as the leading end with reversal rotation of the pair of transport rollers 744 at the reversal discharging path 54*b* (Step S160 in FIG. 17). In this case, the reversal path 54 (or the reversal discharging path 54*b* of the reversal path 54) serves as the transportation start portion of the sheet 9.

Thus, the sheet 9 is fed to the re-transport path 55 while being inverted. Thereafter, the inverted sheet 9 is transported to the final transport path 51 through the re-transport path 55.

Subsequently, when the inverted sheet 9 passes the final transport path 51, the controller 13 detects the deviation amount α of the sheet 9 in the axial direction D (Step S161).

Subsequently, the controller 13 determines whether the sheet 9 has a length held by the upstream pair of movable transport rollers 63 (Step S162).

Figure 17:
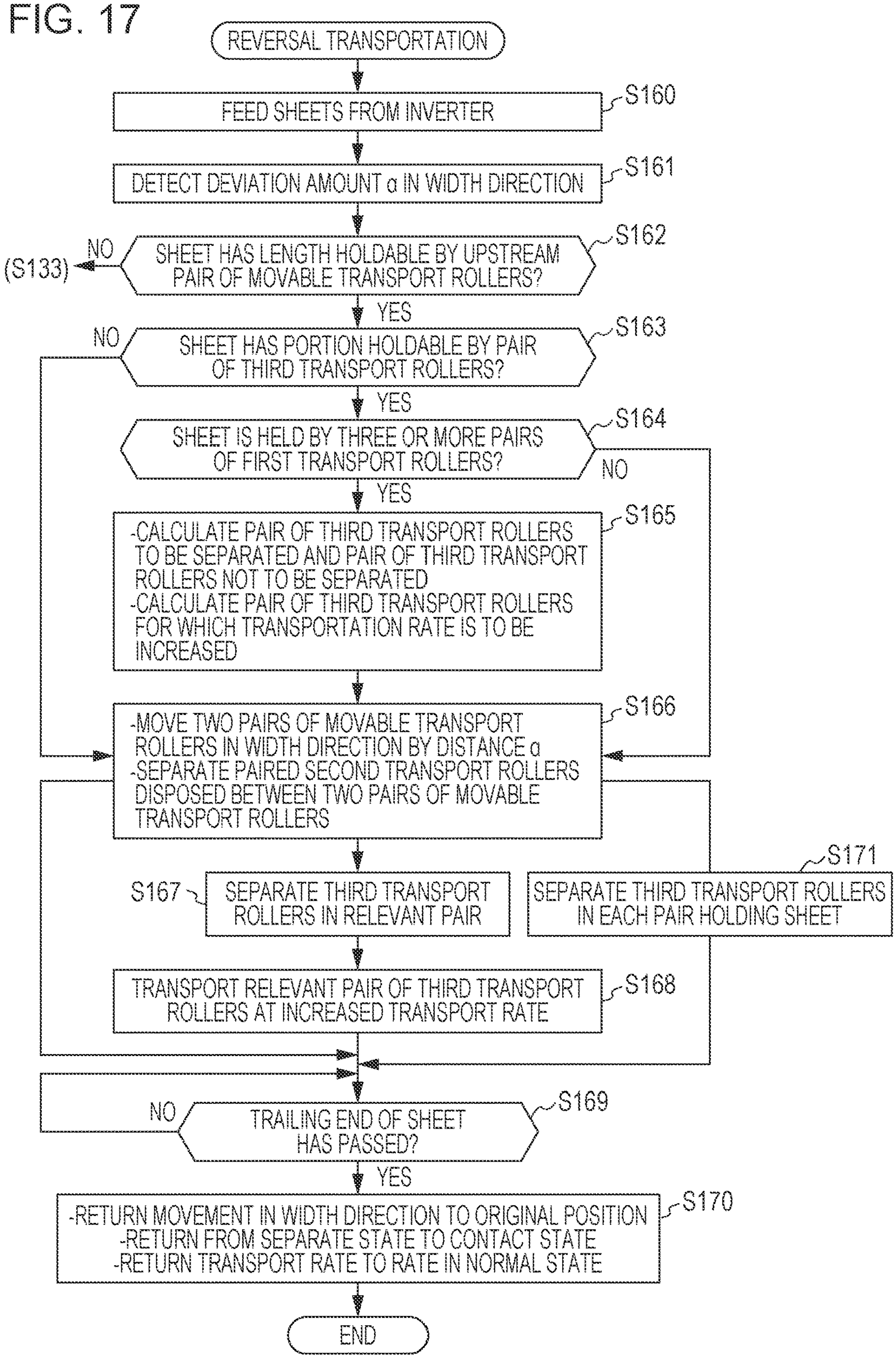
FIG. 17 is a flowchart of the transportation operation including reversal transportation.

When the controller 13 determines in Step S162 that the sheet 9 has a length held by the downstream pair of movable transport rollers 61, but not held by the upstream pair of movable transport rollers 63, the processing proceeds to Step S133 (refer to FIG. 14) as illustrated in FIG. 17.

In this case, the sheet 9 undergoes the transportation operation in Steps S133 to S140 illustrated in FIG. 14.

On the other hand, when the controller 13 determines in Step S162 that the sheet 9 has a length held by the upstream pair of movable transport rollers 63, the controller 13 determines whether the sheet 9 has the portion 9*t* held by one or more of the pairs of third transport rollers 751 to 757 (Step S163).

Also in this case, the sheet 9 is a long sheet as described above.

When the controller 13 determines in Step S163 that the sheet 9 has the portion 9*t* held by one or more of the pairs of third transport rollers 751 to 757, the controller 13 determines whether the portion 9*t* of the sheet is held by three or more pairs of third transport rollers (Step S164).

When the controller 13 determines in Step S164 that the portion 9*t* of the sheet is held by three or more pairs of third transport rollers, the controller 13 calculates each pair of third transport rollers to be separated and each pair of third transport rollers not to be separated, and calculates the pair of third transport rollers for which the transport rate is to be increased (Step S165).

In the second exemplary embodiment, the pairs of third transport rollers that hold the portion 9*t* of the sheet are the four pairs of third transport rollers 751 to 754, as in the assumed case.

In the second exemplary embodiment, as in the assumed case, the pairs of third transport rollers 751 and 752 are calculated as the pairs of third transport rollers to be separated, and the pairs of third transport rollers 753 and 754 are calculated as the pairs of third transport rollers not to be separated. In the second exemplary embodiment, the pair of third transport rollers 754 is also calculated as the pair of third transport rollers for which the transport rate is to be increased.

After the calculation in Step S166 is finished, the two pairs of movable transport rollers 61 and 63 are moved in the axial direction D by the intended distance a, and the paired second transport rollers 711, 712, and 731 disposed between the two pairs of movable transport rollers 61 and 63 are separated (Step S166).

Concurrently with or immediately before the transportation operation of the two pairs of movable transport rollers 61 and 63, the third transport rollers 751 and 752 in the pairs to be separated are separated (Step S167), and the transport rate of the fourth-most downstream pair of third transport rollers 754 for which the transport rate is to be increased is increased (Step S168).

After these operations, the transportation operation at the sheet transport path such as the re-transport path 55 or the final transport path 51 is restarted.

After the movement of the two pairs of movable transport rollers 61 and 63, the separation of the paired second transport rollers 711, 712, and 731, the separation of the paired third transport rollers 751 and 752, and the increase of the transport rate of the pair of third transport rollers 754 are performed and the sheet 9 is transported, the portion 9*t* of the transported sheet is transported in the following manner.

Figure 19A:
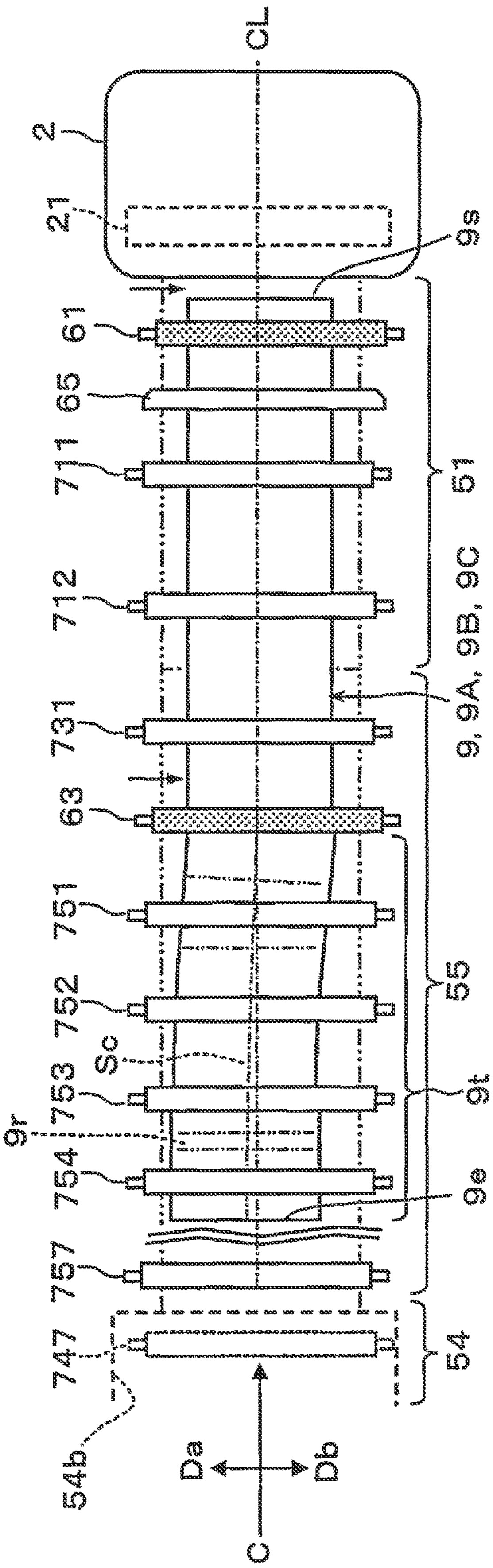
FIG. 19A is a diagram of the state of the sheet when undergoing the transportation operation in FIG. 18.

Specifically, as illustrated in FIG. 18 and FIG. 19A, the portion 9*t* of the sheet is moved in the axial direction D while being held by the pair of movable transport rollers 61 in the transport space 50 from the upstream pair of movable transport rollers 63 to the pair of third transport rollers 752, and transported while being bent in the transport space 50 between the pairs of third transport rollers 753 and 754.

At this time, the portion 9*t* of the transported sheet is released without being held by the pairs of third transport rollers 751 and 752 and left movable. The portion 9*t* of the sheet is bent in the transport space 50 between the pairs of third transport rollers 753 and 754 and easily movable.

Thus, as illustrated in FIG. 19A, in the portion 9*t* of the transported sheet, the portion located downstream from the pair of third transport rollers 753 in the transportation direction C starts moving in the axial direction D to substantially follow the movement of the pairs of movable transport rollers 61 and 63.

In the portion located upstream from the pair of third transport rollers 753 in the transportation direction C, skewing or distortion of the portion 9*t* of the transported sheet passing through the pairs of third transport rollers 753 and 754 is reduced further than in the case where the sheet 9 is transported between the pairs of unseparable third transport rollers 753 and 754 without producing a difference in transport rate between the pairs of unseparable third transport rollers 753 and 754, or transported while being pulled between the pairs of unseparable third transport rollers 753 and 754.

Figure 19B:
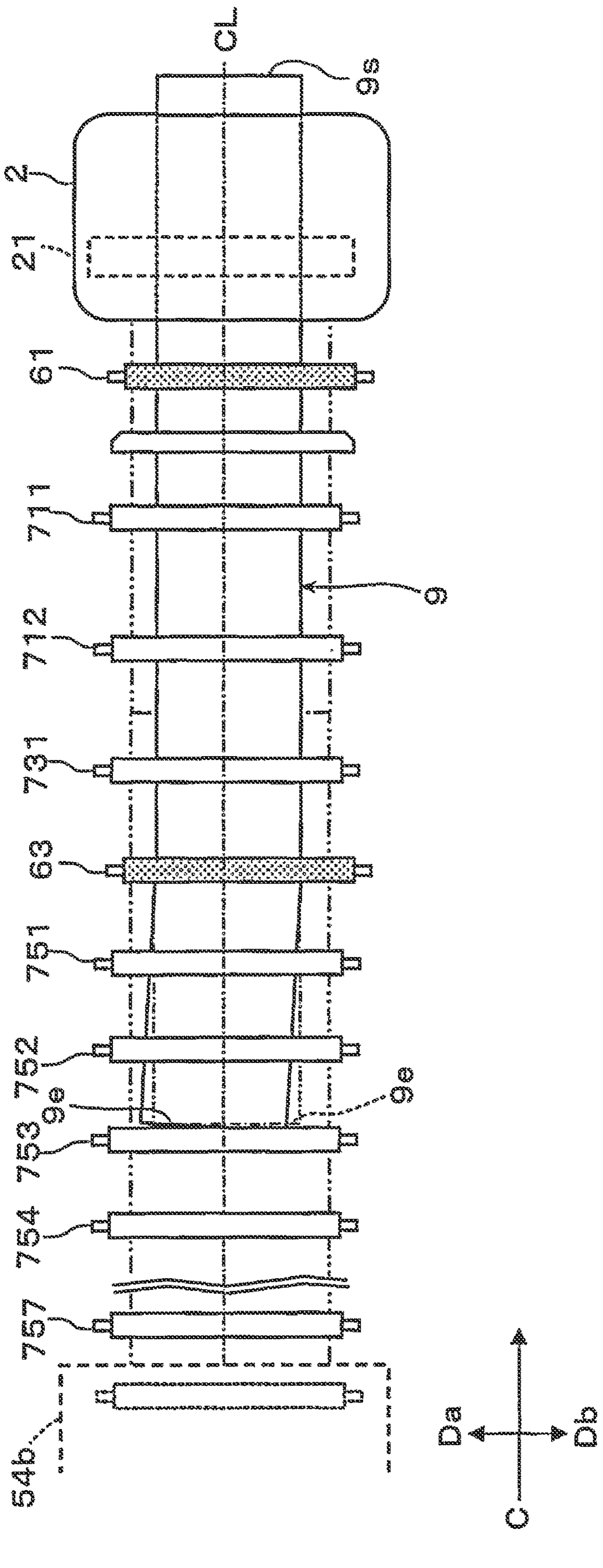
FIG. 19B is a diagram illustrating the state where a trailing end of the sheet in FIG. 19A passes through a third-most downstream one of the pairs of third transport rollers.

As illustrated in FIG. 19B, when the portion 9*t* of the transported sheet is released from the pair of third transport rollers 753 and passes therethrough, the trailing end 9*e* of the sheet 9 moves to the upstream pair of movable transport rollers 63 from the state where the sheet 9 is slightly inclined with respect to the axial direction D as indicated with a solid line in FIG. 19B to the state where the deviation in the axial direction D is corrected as indicated with a two-dot chain line in FIG. 19B.

Thus, the center line Sc of the sheet 9 that has been transported while being deviated in the axial direction D is substantially aligned with the transportation reference line CL, and the deviation in the axial direction D is corrected. Thereafter, the sheet 9 is transported to be finally fed to the image forming portion 2 by the pair of movable transport rollers 61.

When the controller 13 determines in Step S164 that the portion 9*t* of the sheet is held by fewer than three pairs of third transport rollers, the processing fails to proceed to the transportation operation in Step S165, and thus proceeds to the operation in Step S166.

Also in this case, after or immediately before the end of the operation in Step S166, as illustrated in FIGS. 19A and 19B, the paired third transport rollers 751 and 752 that hold the portion 9*t* of the sheet are separated (Step S167). Thus, the deviation of the sheet 9 in the axial direction D is corrected in substantially the same manner as in the case where the transportation operation according to the first exemplary embodiment illustrated in FIG. 11 is performed.

After the operation in Step S167, the transportation operation at the sheet transport path such as the re-transport path 55 or the final transport path 51 is restarted. Thereafter, the sheet 9 is transported to be finally fed to the image forming portion 2 by the pair of movable transport rollers 61.

Subsequently, after the transportation operation at the sheet transport path such as the re-transport path 55 or the final transport path 51 is restarted, the controller 13 determines whether the trailing end 9*e* of the sheet 9 has passed through the pair of movable transport rollers 61 (Step S169).

When the controller 13 determines in Step S163 that the sheet 9 has no portion held by one or more of the pairs of third transport rollers 751 to 757, as illustrated in FIG. 17, the processing proceeds to the operation in Step S166 instead of proceeding to the operation in Step S164.

In this case, after the operation in Step S166 is finished, as illustrated in FIG. 17, the processing proceeds to the operation in Step S169 instead of proceeding to the operations in Steps S167 and S168.

When the controller 13 determines in Step S169 that the trailing end 9*e* of the sheet 9 has passed through the pair of movable transport rollers 61, the controller 13 returns the pair of movable transport rollers 61 to the original position (the reference position in the normal state) before movement, returns the separate state of the pairs of second transport rollers 711, 712, and 731 and the pairs of third transport rollers 751 and 752 to the contact state, and returns the transport rate of the third transport rollers 754 to the rate (V1) in the normal state (Step S170).

Thus, the sheet transport device 5 is prepared for the next transportation operation.

With the above operation, the sheet 9 that is inverted by undergoing reversal transportation has an image formed thereon by the image forming portion 2 on the back surface. The sheet 9 having an image formed on the back surface is transported through the discharging path 52, and finally accommodated in the discharging portion 11.

As described above, when moving the sheet 9 in the axial direction D with the pair of movable transport rollers 61 or the two pairs of movable transport rollers 61 and 63, the sheet transport device 5 reduces skewing or distortion of the portion 9*t* of the sheet that is passing through, for example, all of or one or more of the multiple pairs of first transport rollers 711 and 712 or the pairs of third transport rollers 751 and 752 disposed upstream from the pairs of movable transport rollers 61 and 63.

Thus, compared to the case where the most downstream pair of first transport rollers 711 is a pair of unseparable rollers, the sheet transport device 5 further reduces skewing or distortion of the portion of the transported sheet 9 passing through at least one of, for example, the pairs of first transport rollers 711 and 712.

The sheet transport device 5 transports the sheet 9 while allowing a portion of the sheet 9 to be bent between multiple pairs of unseparable first transport rollers or third transport rollers disposed upstream from the at least one pair of first transport rollers or third transport rollers that are separated. Thus, the sheet transport device 5 reduces skewing or distortion of the portion of the transported sheet passing through the multiple pairs of unseparable first transport rollers or third transport rollers.

Modification Examples

The present disclosure is not limited to the structure examples described in each exemplary embodiment, and the exemplary embodiments may be changed or combined as appropriate within the scope not departing from the gist of the present disclosure described in the scope of claims. The present disclosure includes, for example, modification examples described below.

The sheet transport device 5 may include, as a pair of movable transport rollers, only the pair of movable transport rollers 61 without the upstream pair of movable transport rollers 63. More specifically, for example, the sheet transport device may eliminate a re-transport path.

The characteristics of the sheet transport path such as the number or the form may be other than those described in the first and second exemplary embodiments.

The first and second exemplary embodiments have described a case where the three pairs of transport rollers 711, 712, and 731 are disposed as the pairs of first transport rollers disposed between the two pairs of movable transport rollers 61 and 63. Instead of three pairs, one or more pairs of first transport rollers may be disposed between the two pairs of movable transport rollers 61 and 63.

Instead of the center registration system described in the first and second exemplary embodiments, the sheet may be transported with another reference, for example, with a side registration system. The transportation operation with the side registration system is performed by setting one of the left and right edges of the final transport path 51 in the axial direction D as an edge transportation reference line, and aligning the left or right edge of the sheet 9 in the width direction with the edge transportation reference line.

In the second exemplary embodiment, the most downstream pair of first transport rollers 711 is described as an example of the at least one pair of first transport rollers that are separated in the pairs of first transport rollers that are to hold the portion 9*t* of the transported sheet. However, in addition to the most downstream pair of first transport rollers 711, another pair of first transport rollers may be additionally included as the at least one pair of first transport rollers that are separated depending on the conditions such as the length of the portion 9*t* of the sheet.

In the second exemplary embodiment, the pairs of third transport rollers 751 and 752 are described as examples of the pairs of separable third transport rollers in the pairs of third transport rollers that are to hold the portion 9*t* of the transported sheet. However, another pair of third transport rollers may be used as the at least one pair of third transport rollers that are separated depending on the conditions such as the length of the portion 9*t* of the sheet.

The pairs of first transport rollers or third transport rollers that are to hold the portion 9*t* of the transported sheet may include two or more pairs of unseparable first transport rollers or third transport rollers, although the number of pairs of unseparable transport rollers varies depending on the conditions such as the length of the portion 9*t* of the sheet. In this case, the portion of the sheet passing through the pairs of unseparable first transport rollers or third transport rollers may be transported while being bent.

In the first exemplary embodiment, the controller 13 may preliminary determine the determination in Step S123 (FIG. 11) when receiving a command of the image forming operation. In this case, the determination in Step S123 may be eliminated.

In the second exemplary embodiment, the controller 13 may preliminary determine the determination in Step S133 (FIG. 14) or the determinations in Steps S162 and S163 (FIG. 17) when receiving a command of the image forming operation. In this case, the determination in Step S133 or the determinations in Steps S162 and S163 may be eliminated.

When the sheet transport device 5 includes the two pairs of movable transport rollers 61 and 63, the upstream pair of movable transport rollers 63 may be disposed at the transport path other than the re-transport path 55. In the first and second exemplary embodiments, the upstream pair of movable transport rollers 63 may be disposed at the second transport path 56 or the third transport path 57.

In the sheet transport device 5, the pair of first transport rollers disposed upstream from the pair of movable transport rollers 61 in the transportation direction C is not limited to the pair of transport rollers disposed at the final transport path 51 and the first transport path 53. More specifically, the pair of first transport rollers may be a pair of transport rollers disposed at the final transport path 51 and the second transport path 56 or a pair of transport rollers disposed at the final transport path 51 and the third transport path 57.

When the sheet transport device 5 produces a difference in transport rate to transport the sheet 9 in a bent state, instead of controlling (adjusting the rotation rate of) the driving motor of the pair of transport rollers for which the transport rate is to be increased, for example, the transport rate of a driving transmission mechanism that transmits rotation power from the driving motor to the pair of transport rollers for which the transport rate is to be increased may be changed.

The difference in transport rate in this case may be caused by a method other than a method of changing the transport rate of the upstream pair of transport rollers located upstream in the transportation direction C to a transport rate higher than the transport rate of the downstream pair of transport rollers disposed immediately downstream from the pair of transport rollers. As long as causing no problem in the entire sheet transportation, the difference in transport rate may be produced by changing the transport rate of the downstream pair of transport rollers to a transport rate lower than the transport rate of the upstream pair of transport rollers.

The image forming portion 2 in the image forming apparatus 1 may be any portion capable of forming images on the sheet 9, and may have any form or other characteristics.

Thus, the image forming portion 2 may be of a form that, for example, sprays or transfers ink forming an image to the sheet 9. The type of the image is not limited to a particular one. The image may be, for example, of a type entirely formed on one or both surfaces of the sheet 9.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A sheet transport device, comprising:

a pair of movable transport rollers capable of transporting a sheet while holding the sheet and capable of moving in an axial direction crossing a transportation direction;

a plurality of pairs of first transport rollers disposed upstream from the pair of movable transport rollers in the transportation direction while being spaced apart from each other to transport the sheet while holding the sheet; and a plurality of pairs of transport guides disposed to define sheet transport spaces between the pair of movable transport rollers and the plurality of pairs of first transport rollers and between the plurality of pairs of first transport rollers, wherein, when the pair of movable transport rollers is to be moved in the axial direction, first transport rollers in at least one of the plurality of pairs of first transport rollers are separated not to hold at least part of a portion of the transported sheet located upstream from the pair of movable transport rollers, wherein the at least one pair of first transport rollers that are separated includes at least one pair of first transport rollers including a most downstream one of the pairs of first transport rollers that hold the portion of the transported sheet, and wherein a plurality of pairs of first transport rollers that are not separated while holding the portion of the sheet and located upstream from the at least one pair of first transport rollers that are separated transport the sheet while bending the portion of the sheet in the transport spaces by producing a difference in transport rate between the plurality of pairs of first transport rollers that are not separated.

2. The sheet transport device according to claim 1, wherein the at least one pair of first transport rollers that are separated includes all of the pairs of first transport rollers that hold the portion of the transported sheet.

3. An image forming apparatus, comprising:

a transportation start portion from which a sheet is transported;

an image forming portion that forms an image on the sheet; and a sheet transport device that transports the sheet from the transportation start portion to the image forming portion, wherein at least part of the sheet transport device is formed from the sheet transport device according to claim 2.

4. The sheet transport device according to claim 1, wherein the first transport rollers in the at least one pair of first transport rollers that are separated are in contact with each other in a normal state when the pair of movable transport rollers is not moving and when the pair of movable transport rollers finishes transporting the sheet after being moved.

5. An image forming apparatus, comprising:

a transportation start portion from which a sheet is transported;

an image forming portion that forms an image on the sheet; and a sheet transport device that transports the sheet from the transportation start portion to the image forming portion, wherein at least part of the sheet transport device is formed from the sheet transport device according to claim 4.

6. The sheet transport device according to claim 1, wherein a sheet transport path where the plurality of pairs of first transport rollers are disposed includes a bent section that is at least partially bent.

7. An image forming apparatus, comprising:

a transportation start portion from which a sheet is transported;

an image forming portion that forms an image on the sheet; and a sheet transport device that transports the sheet from the transportation start portion to the image forming portion, wherein at least part of the sheet transport device is formed from the sheet transport device according to claim 6.

8. An image forming apparatus, comprising:

a transportation start portion from which a sheet is transported;

an image forming portion that forms an image on the sheet; and a sheet transport device that transports the sheet from the transportation start portion to the image forming portion, wherein at least part of the sheet transport device is formed from the sheet transport device according to claim 1.

9. The image forming apparatus according to claim 8, wherein the transportation start portion is a sheet inverter that inverts a sheet that has passed the image forming portion, and wherein at least part of the sheet transport device includes a re-transport path along which the sheet transported from the sheet inverter is re-transported to the image forming portion.

10. A sheet transport device, comprising:

two pairs of movable transport rollers capable of transporting a sheet while holding the sheet and capable of moving in an axial direction crossing a transportation direction, the two pairs of movable transport rollers being spaced apart from each other in the transportation direction;

one or more pairs of second transport rollers disposed between the two pairs of movable transport rollers to transport the sheet while holding the sheet;

a plurality of pairs of third transport rollers disposed upstream in the transportation direction from an upstream one of the two pairs of movable transport rollers disposed upstream in the transportation direction, while being spaced apart from each other, to transport the sheet while holding the sheet; and a plurality of pairs of transport guides disposed to define sheet transport spaces between the two pairs of movable transport rollers and between the plurality of pairs of third transport rollers, wherein, when the two pairs of movable transport rollers are to be moved in the axial direction, third transport rollers in at least one of the plurality of pairs of third transport rollers are separated not to hold at least part of a portion of the transported sheet located upstream from the upstream pair of movable transport rollers.

11. The sheet transport device according to claim 10, wherein the at least one pair of third transport rollers that are separated includes all of the pairs of third transport rollers that hold the portion of the transported sheet.

12. An image forming apparatus, comprising:

a transportation start portion from which a sheet is transported;

an image forming portion that forms an image on the sheet; and a sheet transport device that transports the sheet from the transportation start portion to the image forming portion, wherein at least part of the sheet transport device is formed from the sheet transport device according to claim 11.

13. The sheet transport device according to claim 10, wherein the at least one pair of third transport rollers that are separated includes at least one pair of third transport rollers including a most downstream one of the pairs of third transport rollers that hold the portion of the transported sheet, and wherein a plurality of pairs of third transport rollers that are not separated while holding the portion of the sheet and located upstream from the at least one pair of third transport rollers that are separated transport the sheet while bending the portion of the sheet in the transport spaces by producing a difference in transport rate between the plurality of pairs of third transport rollers that are not separated.

14. An image forming apparatus, comprising:

a transportation start portion from which a sheet is transported;

an image forming portion that forms an image on the sheet; and a sheet transport device that transports the sheet from the transportation start portion to the image forming portion, wherein at least part of the sheet transport device is formed from the sheet transport device according to claim 13.

15. The sheet transport device according to claim 10, wherein the third transport rollers in the at least one pair of third transport rollers that are separated are in contact with each other in a normal state when the two pairs of movable transport rollers are not moving and when the two pairs of movable transport rollers finish transporting the sheet after being moved.

16. The sheet transport device according to claim 10, wherein a sheet transport path between the two pairs of movable transport rollers is bent.

17. The sheet transport device according to claim 16, wherein a sheet transport path where the plurality of pairs of third transport rollers are disposed is formed from a straight section that is a specific section extending straight from the upstream pair of movable transport rollers.

18. An image forming apparatus, comprising:

a transportation start portion from which a sheet is transported;

an image forming portion that forms an image on the sheet; and a sheet transport device that transports the sheet from the transportation start portion to the image forming portion, wherein at least part of the sheet transport device is formed from the sheet transport device according to claim 10.

* * * * *